United States Patent
Wu et al.

(10) Patent No.: US 11,251,879 B1
(45) Date of Patent: Feb. 15, 2022

(54) MOBILE TERMINAL TESTING DEVICE AND MOBILE TERMINAL TESTING METHOD

(71) Applicant: ANRITSU CORPORATION, Kanagawa (JP)

(72) Inventors: Zhihui Wu, Kanagawa (JP); Takumi Nakamura, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 0 days.

(21) Appl. No.: 17/355,889

(22) Filed: Jun. 23, 2021

(30) Foreign Application Priority Data

Sep. 28, 2020 (JP) .............................. JP2020-161934

(51) Int. Cl.
*H04B 17/00* (2015.01)
*H04B 17/15* (2015.01)
*H04B 17/29* (2015.01)

(52) U.S. Cl.
CPC ......... *H04B 17/0085* (2013.01); *H04B 17/15* (2015.01); *H04B 17/29* (2015.01)

(58) Field of Classification Search
CPC ..... H04B 17/0085; H04B 17/15; H04B 17/29
See application file for complete search history.

(56) References Cited

U.S. PATENT DOCUMENTS

| | | | | |
|---|---|---|---|---|
| 4,219,770 A * | 8/1980 | Weinert | ................. | G01N 22/00 324/615 |
| 5,578,935 A * | 11/1996 | Burns | ................. | G01R 13/345 324/121 R |
| 5,589,763 A * | 12/1996 | Burns | ................. | G01R 31/2851 324/76.15 |
| 10,084,555 B1 * | 9/2018 | Olgaard | ................. | H04B 17/29 |
| 10,666,538 B2 * | 5/2020 | Olgaard | ................. | H04W 24/00 |
| 2004/0128054 A1 * | 7/2004 | Jaliwala | ............. | F02D 41/2467 701/104 |
| 2004/0128055 A1 * | 7/2004 | Jaliwala | ................. | F02D 41/401 701/104 |
| 2006/0084873 A1 * | 4/2006 | Baba | ........................ | A61B 8/13 600/441 |

(Continued)

OTHER PUBLICATIONS

3GPP Technical Specifications, V16.7.0 (Mar. 2021), Release 16, Chapter 38.521-2, Section 7.3.2, Reference Sensitivity Power Level.

*Primary Examiner* — Dominic E Rego
(74) *Attorney, Agent, or Firm* — Pearne & Gordon LLP

(57) ABSTRACT

In a measurement device, a reception sensitivity test control unit includes drop determination means for determining whether or not a measured throughput is in a dropped state to a preset proportion in a steep drop region in which the throughput drops steeply, and output level setting means 18e for performing a setting process of setting an output level of the test signal to be different from a previous output level according to a comparison result indicating whether a throughput measurement result exceeds a predetermined threshold value and a determination result indicating whether the measured throughput is in the dropped state by the drop determination means, the setting process including a process of performing level down or level up on the output level of the test signal with respect to the previous output level in units of an error tolerance level EL when it is determined to be the dropped state.

9 Claims, 15 Drawing Sheets

(56) References Cited

U.S. PATENT DOCUMENTS

| | | | |
|---|---|---|---|
| 2006/0217073 A1* | 9/2006 | Saitou | H04W 52/20 455/67.11 |
| 2012/0254164 A1* | 10/2012 | Ide | G06F 16/334 707/723 |
| 2013/0294144 A1* | 11/2013 | Wang | G11C 29/56008 365/148 |
| 2014/0036715 A1* | 2/2014 | Chung | H04W 52/20 370/252 |
| 2016/0029404 A1* | 1/2016 | Aryafar | H04W 72/1231 370/277 |
| 2019/0369158 A1* | 12/2019 | Murao | G01R 31/2621 |
| 2019/0393968 A1* | 12/2019 | Ioffe | H04B 17/14 |
| 2020/0371903 A1* | 11/2020 | Straub | G06F 11/368 |
| 2021/0055925 A1* | 2/2021 | Zhu | G06F 8/658 |

* cited by examiner

| Number of measure-ments | OL(n) (dBm) | Through-put | Measurement result based on determination condition | SL(n)(dB) (OL(n) − OL(n−1)) | Process of next output level | Next output level |
|---|---|---|---|---|---|---|
| 1 | −75 | PASS | NO | −10 (=SL0) | Level down A | OL(2) = OL(1) − \|SL(1)\| |
| 2 | −85 | PASS | YES | −10 | Level down B | OL(3) = OL(2) − 2EL |
| 3 | −85.4 | FAIL | − | −0.4 | Level up A | OL(4) = OL(3) + EL |
| 4 | −85.2 | PASS | − | +0.2 | End measurement since SL(4) < EL(= 0.2) | |

FIG. 9

| Search step | Output level of nonlinear, dBm | Output level of improved nonlinear, dBm | Throughput, % | comment |
|---|---|---|---|---|
| 1 | -75 | -75 | 100 | |
| 2 | -85 | -85 | 95.69 | |
| 3 | -95 | -85.4 | 92.62 | |
| 4 | -90 | -85.2 | 95.05 | |
| 5 | -85 | | | |
| 6 | -87.5 | | | |
| 7 | -86.25 | | | |
| 8 | -85.625 | | | |
| 9 | -85.3125 | | | |
| Total of steps = | 9 | 4 | | Improved rate = 2.25 |

FIG. 10

MOBILE TERMINAL TESTING DEVICE AND MOBILE TERMINAL TESTING METHOD

TECHNICAL FIELD

The present invention relates to a mobile terminal testing device and a mobile terminal testing method for performing a reception sensitivity test of receiving a test signal by a device under test and measuring reception sensitivity a plurality of times, and testing a mobile terminal which is the device under test.

BACKGROUND ART

For a wireless terminal that has been developed in recent years and transmits and receives a radio signal corresponding to IEEE802.11ad, 5G cellular, and the like, in which a signal in a wide band of a millimeter wave band is used, a performance test is performed of measuring an output level and reception sensitivity of a transmitted radio wave determined for each communication standard with respect to a wireless communication antenna included in the wireless terminal, and determining whether or not a predetermined reference is satisfied.

For example, in a performance test in which a wireless terminal for a 5G New Radio (NR) system (hereinafter, referred to as a 5G wireless terminal) is used as a Device Under Test (DUT), an OTA test is performed using a radio anechoic box (OTA chamber) called a Compact Antenna Test Range (CATR) which is not affected by a surrounding radio wave environment.

For various tests, such as OTA tests, targeting 5G wireless terminals, for example, tests are obliged to be performed according to standards disclosed in Non-Patent Document 1.

For example, regarding a DUT reception sensitivity test for aggregating measurement results by executing an operation of receiving a test signal transmitted from a signal generator by the DUT (5G wireless terminal) and measuring reception sensitivity a plurality of times, a Section 7.3.2 of Chapter 38.521-2 of non-patent document 1 discloses provisions such as a minimum allowable output level [dB] of the test signal.

RELATED ART DOCUMENT

Non-Patent Document

[Non-Patent Document 1] 3GPP Technical Specifications, Chapter 38.521-2, 7.3.2

DISCLOSURE OF THE INVENTION

Problem that the Invention is to Solve

A mobile terminal testing device according to the related art, which obtains a measurement result of reception sensitivity by executing an operation of receiving a test signal by a DUT and measuring the reception sensitivity a plurality of times, generally adopts a method (refer to a test result display area 135b of a main screen 135a in FIG. 15) for performing sequential change (linear change) by a constant level as the number of measurements increases from an output level set in an initial reception sensitivity test in order to maintain the output level of the test signal as a value according to a standard described in Non-Patent Document 1.

Therefore, in the mobile terminal testing device according to the related art, a long time is taken to control the output level of the test signal transmitted from a signal generator to an output level (testable level) suitable for the reception sensitivity test of the mobile terminal, so that, as a result, there is a problem in that a test time of the reception sensitivity test becomes long.

The present invention has been made to solve the problems according to the related art, and an object of the present invention is to provide a mobile terminal testing device and a mobile terminal testing method that can set an output level of a test signal to a testable level in a short time and can efficiently perform a reception sensitivity test of the mobile terminal.

Means for Solving the Problem

In order to solve the above problems, there is provided a mobile terminal testing device for testing a mobile terminal (100), which is a device under test, including: reception sensitivity test execution means (18) for executing a test of calculating reception sensitivity by repeating transmission and reception of a test signal from a signal generator (20) to the device under test, in which the reception sensitivity test execution means includes test condition setting means (18b) for setting a predetermined error tolerance level (EL), throughput measurement means (18c) for measuring a throughput related to reception capacity of the mobile terminal for each transmission and reception, drop determination means (18d) for determining whether the measured throughput is in a dropped state to a preset proportion in a steep drop region in which the throughput drops steeply, output level setting means (18e) for performing a setting process of setting an output level of the test signal to be different from a previous output level according to a comparison result indicating a throughput measurement result exceeds a predetermined threshold value and a determination result indicating whether the measured throughput is in the dropped state by the drop determination means, the setting process including a process of performing level down or level up on the output level of the test signal with respect to the previous output level in units of the error tolerance level (EL) when it is determined to be the dropped state, and measurement result output means (18f) for continuing the transmission and reception in a case where a fluctuation range with respect to the previous output level exceeds the error tolerance level which is set by the test condition setting means, and outputting the test result in a case where the fluctuation range with respect to the previous output level is in a range of the error tolerance level.

With the configuration, the mobile terminal testing device according to the present invention checks the fluctuation range between the previous and current output levels while performing level down or level up on the output level of the test signal in units of the predetermined error tolerance level (EL) when the measured throughput drops to the proportion in the steep drop region. As a result, compared to a case of performing level down or level up on the output level with the step fluctuation range derived from the initial step fluctuation range throughout an entire period, it is possible to reduce the number of transmissions and receptions, so that it is possible to significantly reduce the measurement time.

Further, in the mobile terminal testing device according to the present invention, the test condition setting means (18b) may further set an initial step fluctuation range related to a step fluctuation of the output level, the drop determination means may execute a process of determining whether the measured throughput is in the dropped state when the comparison result indicating that the throughput measurement result exceeds the threshold value is obtained, and the output level setting means may perform a process of performing level down on the output level of the test signal by a value twice the error tolerance level from the previous output level according to the determination result indicating the measured throughput is in the dropped state or a process of performing level down on the output level of the test signal by a value corresponding to the initial step fluctuation range from the previous output level in a case where the comparison result indicating that the throughput measurement result exceeds the threshold value is obtained, and performs a process of performing level up on the output level of the test signal by a value of the error tolerance level (EL) from the previous output level in a case where the comparison result indicating that the throughput measurement result does not exceed the threshold value is obtained.

With the configuration, the mobile terminal testing device according to the present invention continuously performs the transmission and reception at an output level obtained by performing level down on a value twice the fluctuation range, which is set from the previous output level, and the transmission and reception at an output level obtained by performing level up on the output level of the test signal by the value of the fluctuation range, which is set from the previous output level, in the state where the measured throughput drops to the preset proportion in the steep drop region a1, so that the step fluctuation range therebetween is equal to or less than the set fluctuation range and the measurement is immediately ended. As a result, it possible to obtain the test result of the reception sensitivity test in an extremely short time.

Further, in the mobile terminal testing device according to the present invention, the test condition setting means may use a value of the throughput, which is measured by the throughput measurement means in a first transmission and reception, as a reference value, and may set a range of a proportion which exceeds 95% and is equal to or less than 99% with respect to the reference value as a determination condition for determining whether the measured throughput is in the dropped state, and the drop determination means may determine whether the measured throughput is in the dropped state according to whether the measured throughput is in the range of the proportion.

With the configuration, in a case where the measured throughput is a value in the range of the proportion which exceeds 95% and is equal to or less than 99% with respect to the reference value which indicates that the measured throughput drops steeply, the mobile terminal testing device according to the present invention can reduce the number of transmissions and receptions by stopping to perform level down or level up on the output level by the step fluctuation range derived from the initial step fluctuation range, so that it is possible to significantly reduce the measurement time.

Further, the mobile terminal testing device according to the present invention may further include a radio anechoic box (50) including an internal space (51), and scanning means (16, 56) for driving and scanning the mobile terminal so as to continuously change an orientation of the mobile terminal in the internal space, in which the reception sensitivity test may be performed in all orientations to be scanned by the scanning means in an over the air (OTA) measurement environment in the internal space.

With the configuration, the mobile terminal testing device according to the present invention reduces the number of transmissions and receptions to significantly reduce time for the reception sensitivity test by introducing CP even under a situation in which reception sensitivity measurement should be performed for all orientations under an OTA environment.

Further, in order to solve the above problems, there is provided a mobile terminal testing method for testing a mobile terminal (100) which is a device under test by executing a test of calculating reception sensitivity by repeating transmission and reception of a test signal from a signal generator (20) to the device under test, the mobile terminal testing method including: a test condition setting step (S1) of setting a predetermined error tolerance level (EL), a throughput measurement step (S4) of measuring a throughput related to reception capacity of the mobile terminal for each transmission and reception, a drop determination step (S7) of determining whether the measured throughput is in a dropped state to a preset proportion in a steep drop region in which the throughput drops steeply, an output level setting step (S8b, S9) of performing a setting process of setting an output level of the test signal to be different from a previous output level according to a comparison result indicating whether a throughput measurement result exceeds a predetermined threshold value and a determination result indicating whether or not the measured throughput is in the dropped state by the drop determination step, the setting process including a process of performing level down or level up on the output level of the test signal with respect to the previous output level in units of the error tolerance level (EL) when it is determined to be the dropped state, and a measurement result output step (S10) of continuing the transmission and reception in a case where a fluctuation range with respect to the previous output level exceeds the error tolerance level which is set by the test condition setting step, and outputting the test result in a case where the fluctuation range with respect to the previous output level is in a range of the error tolerance level.

With the configuration, in the mobile terminal testing method according to the present invention, the fluctuation range between the previous and current output levels is checked while performing level down or level up on the output level of the test signal in units of the predetermined error tolerance level (EL) when the measured throughput drops to the proportion in the steep drop region. As a result, compared to a case of performing level down or level up on the output level with the step fluctuation range derived from the initial step fluctuation range throughout an entire period, it is possible to reduce the number of transmissions and receptions, so that it is possible to significantly reduce the measurement time.

Advantage of the Invention

The present invention can provide a mobile terminal testing device and a mobile terminal testing method that can set an output level of a test signal to a testable level in a short time and can efficiently perform a reception sensitivity test of a mobile terminal.

BRIEF DESCRIPTION OF THE DRAWINGS

FIGS. 5A and 5B are diagrams showing total spherical scanning images of a device under test of the measurement device according to the embodiment of the present invention in an OTA chamber, in which FIG. 5A shows a disposition mode of the device under test with respect to a center of a spherical coordinate system, and FIG. 5B shows a distribution mode of angular sample points PS in the spherical coordinate system.

FIGS. 8A and 8B are flowcharts showing details of a process in step S8 of FIG. 7, in which FIG. 8A shows a level down process (A) and FIG. 8B shows a level down process (B).

FIG. 9 is a table diagram showing a data configuration example showing a relationship of a parameter related to an output level of a test signal, which is set according to the number of measurements by output level variable setting control shown in FIG. 7.

FIG. 10 is a table diagram showing a relationship between the number of measurements and a measurement value of each of the output level of the test signal and a throughput related to the reception sensitivity test of the DUT of the measurement device according to the embodiment of the present invention.

BEST MODE FOR CARRYING OUT THE INVENTION

Hereinafter, an embodiment of a mobile terminal testing device and a mobile terminal testing method according to the present invention will be described with reference to the accompanying drawings.

Figure 1:
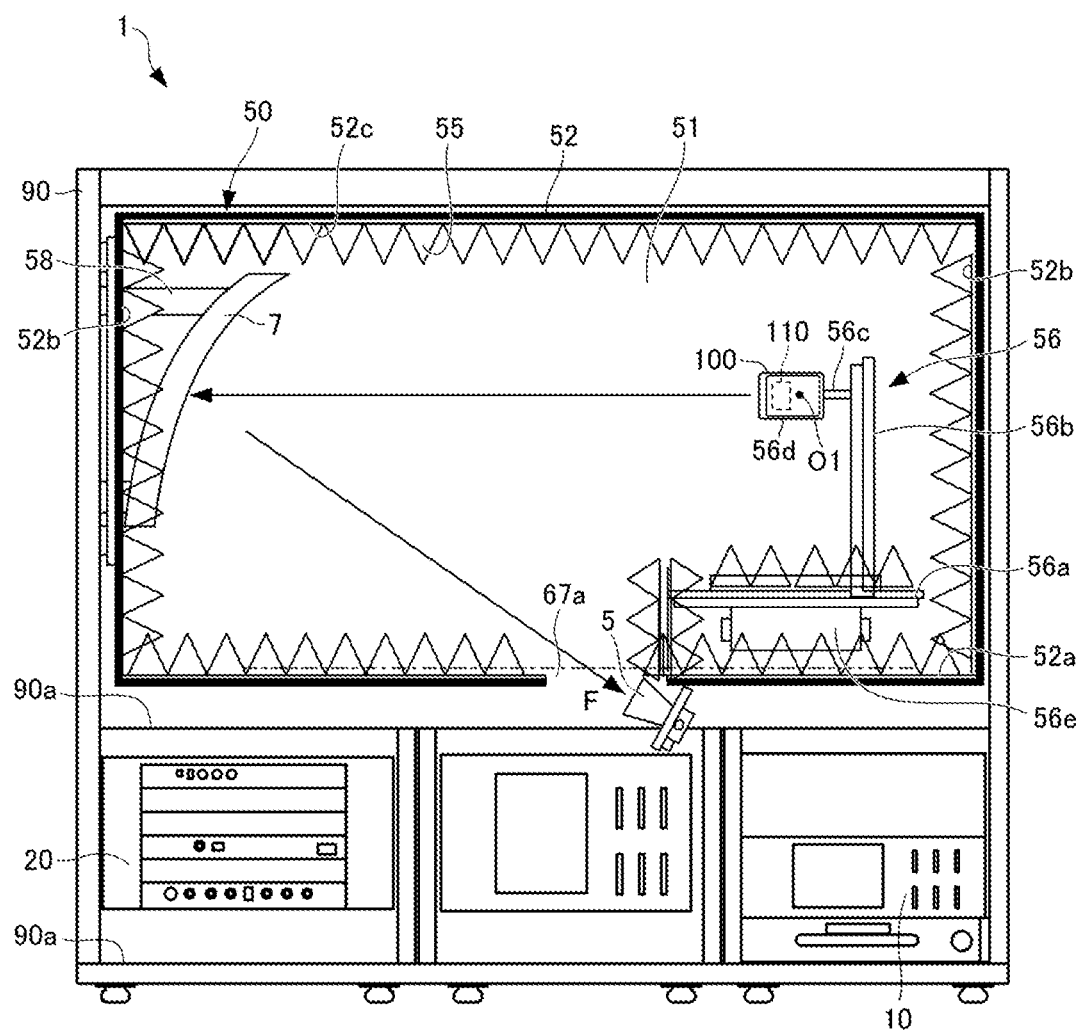
FIG. 1 is a diagram showing a schematic configuration of an entire measurement device according to an embodiment of the present invention.
Figure 2:
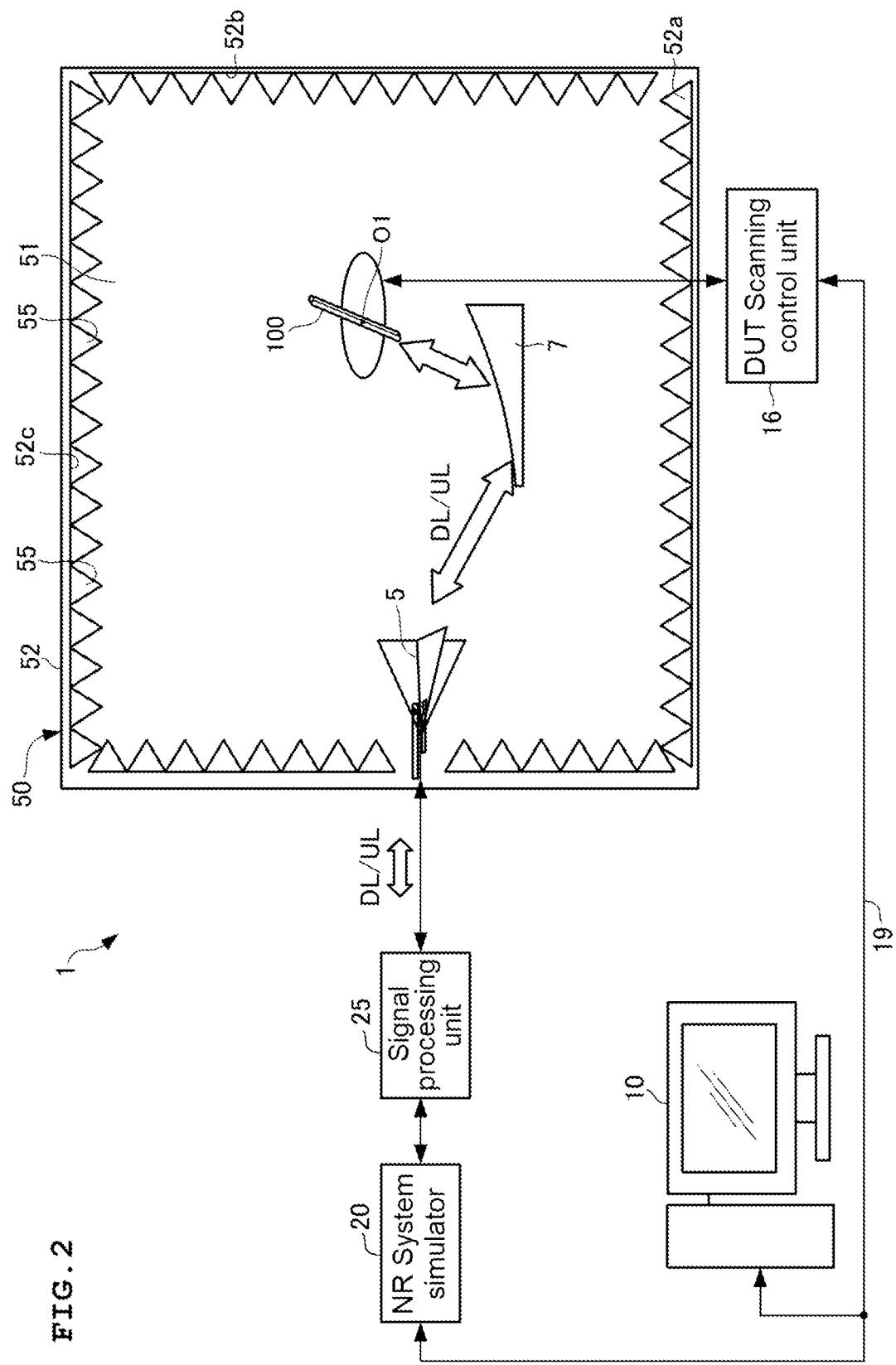
FIG. 2 is a block diagram showing a functional configuration of the measurement device according to the embodiment of the present invention.

First, a configuration of a measurement device 1 according to the embodiment of the present invention will be described with reference to FIGS. 1 to 4. The measurement device 1 constitutes the mobile terminal testing device of the present invention. The measurement device 1 according to the present embodiment has an external structure as shown in FIG. 1 as a whole, and includes functional blocks as shown in FIG. 2. FIGS. 1 and 2 show a disposition mode of each component of an OTA chamber 50 in a state of being seen through from a side surface thereof.

The measurement device 1 is operated, for example, in a mode in which each of the above-described components is mounted on each rack 90a of a rack structure 90 having the structure shown in FIG. 1. FIG. 1 shows an example in which each of an integrated control device 10, an NR system simulator 20, and an OTA chamber 50 is mounted on each rack 90a of the rack structure 90.

As shown in FIG. 2, the measurement device 1 according to the present embodiment includes the integrated control device 10, the NR system simulator 20, a signal processing unit 25, and the OTA chamber 50.

For the configuration, here, the OTA chamber 50 will be described first for convenience. As shown in FIGS. 1 and 2, the OTA chamber 50 includes, for example, a metal housing main body 52 having a rectangular internal space 51, and accommodates a DUT 100 having an antenna 110, a test antenna 5, a reflector 7, and a DUT scanning mechanism 56 in the internal space 51.

A radio wave absorber 55 is attached to a whole area of an inner surface of the OTA chamber 50, that is, a bottom surface 52a, a side surface 52b, and a top surface 52c of the housing main body 52. As a result, in the OTA chamber 50, each element (the DUT 100, the test antenna 5, the reflector 7, and the DUT scanning mechanism 56) disposed in the internal space 51 has an enhanced function of regulating intrusion of radio waves from the outside and radiation of the radio waves to the outside. In this way, the OTA chamber 50 realizes a radio anechoic box having the internal space 51 that is not affected by a surrounding radio wave environment. The radio anechoic box used in the present embodiment is, for example, an Anechoic type.

Among those accommodated in the internal space 51 of the OTA chamber 50, the DUT 100 is, for example, a wireless terminal such as a smartphone. Communication standards for the DUT 100 include cellular (LTE, LTE-A, W-CDMA (registered trademark), GSM (registered trademark), CDMA 2000, 1×EV-DO, TD-SCDMA, or the like), wireless LAN (IEEE 802.11b/g/a/n/ac/ad, or the like), Bluetooth (registered trademark), GNSS (GPS, Galileo, GLONASS, BeiDou, or the like), FM, and digital broadcasting (DVB-H, ISDB-T, or the like). Further, the DUT 100 may be a wireless terminal that transmits and receives a radio signal in a millimeter wave band corresponding to IEEE 802.11ad, 5G cellular, or the like.

In the present embodiment, the antenna 110 of the DUT 100 uses a radio signal in each regulated frequency band in conformity with, for example, LTE or 5G NR communication standard. The DUT 100 constitutes the device under test, that is, a mobile terminal in the present invention.

In the internal space 51 of the OTA chamber 50, the DUT 100 is held by a part of mechanism of the DUT scanning mechanism 56. The DUT scanning mechanism 56 is provided to extend in a vertical direction on the bottom surface 52a of the housing main body 52 in the internal space 51 of the OTA chamber 50. The DUT scanning mechanism 56 performs a total spherical scanning (refer to FIGS. 5A and 5B and FIG. 6), which will be described later, on the DUT 100 while holding the DUT 100 on which a performance test is performed.

As shown in FIG. 1, the DUT scanning mechanism 56 includes a turntable 56a, a support column member 56b, a DUT mounting portion 56c, and a drive unit 56e. The turntable 56a includes a plate member having a disk shape, and has a configuration (refer to FIG. 3) that rotates around an azimuth axis (a rotation axis in the vertical direction). The support column member 56b includes a columnar member disposed to extend in a direction perpendicular to a plate surface of the turntable 56a.

The DUT mounting portion 56c is disposed near an upper end of the support column member 56b to be in parallel with the turntable 56a, and has a mounting tray 56d on which the DUT 100 is mounted. The DUT mounting portion 56c has a configuration (refer to FIG. 3) capable of rotating around the roll axis (a rotation axis in a horizontal direction).

Figure 3:
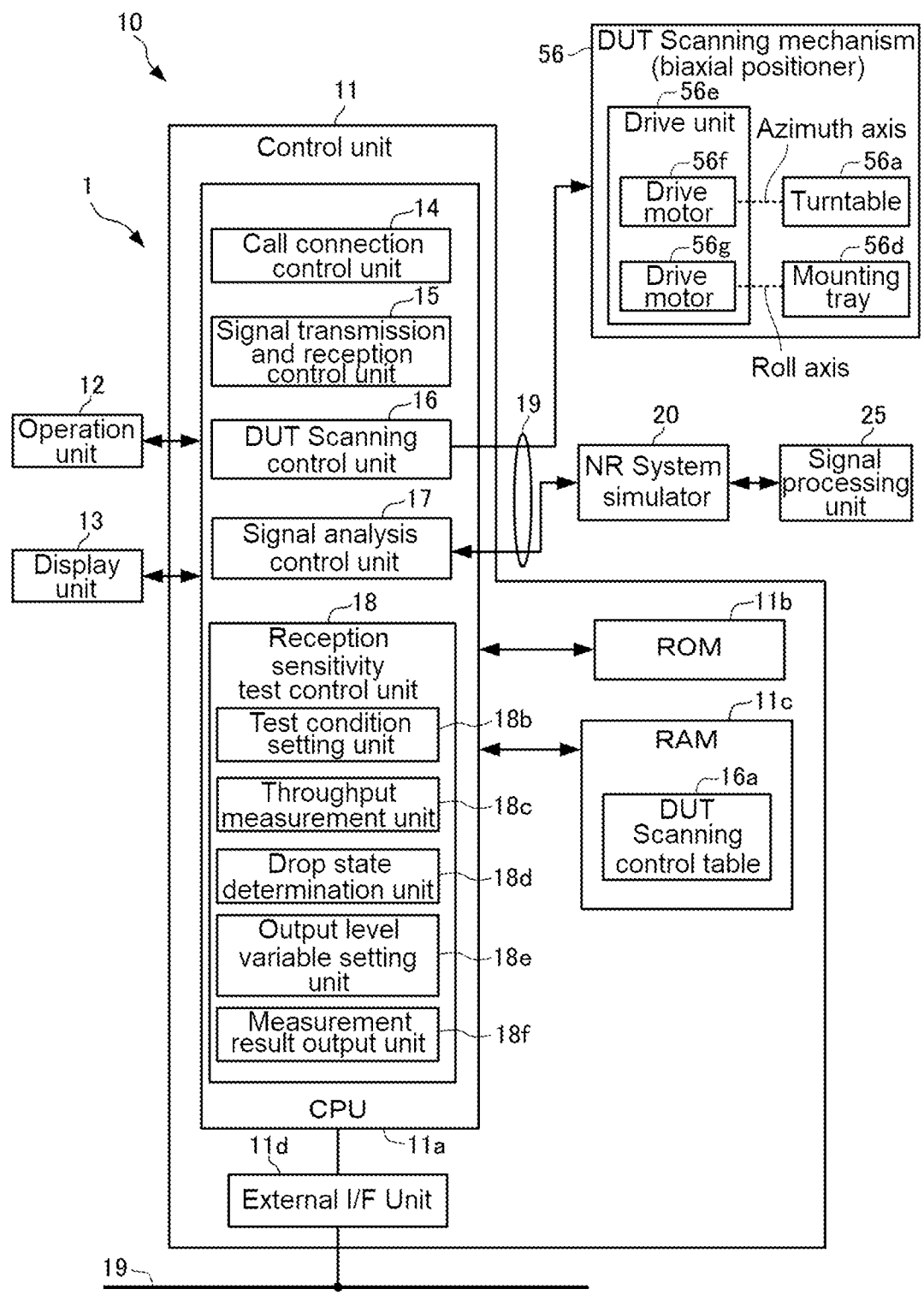
FIG. 3 is a block diagram showing functional configurations of an integrated control device of the measurement device according to the embodiment of the present invention and a controlled element thereof.

As shown in FIG. 3, the drive unit 56e includes, for example, a drive motor 56f that rotationally drives the azimuth axis, and a drive motor 56g that rotationally drives the roll axis. The drive unit 56e includes a biaxial positioner provided with a mechanism for rotating the azimuth axis and the roll axis in respective rotation direction thereof by the drive motor 56f and the drive motor 56g. In this way, the drive unit 56e can rotate the DUT 100 mounted on the mounting tray 56d in biaxial (the azimuth axis and the roll axis) directions for each mounting tray 56d. Hereinafter, there is a case where the entire DUT scanning mechanism 56 including the drive unit 56e is referred to as the biaxial positioner (refer to FIG. 3). Each of the drive unit 56e and the drive motors 56f and 56g constitutes drive means, first rotary drive means, and second rotary drive means in the present invention. The mounting tray 56d constitutes the device under test mounting portion in the present invention.

Figure 5A:
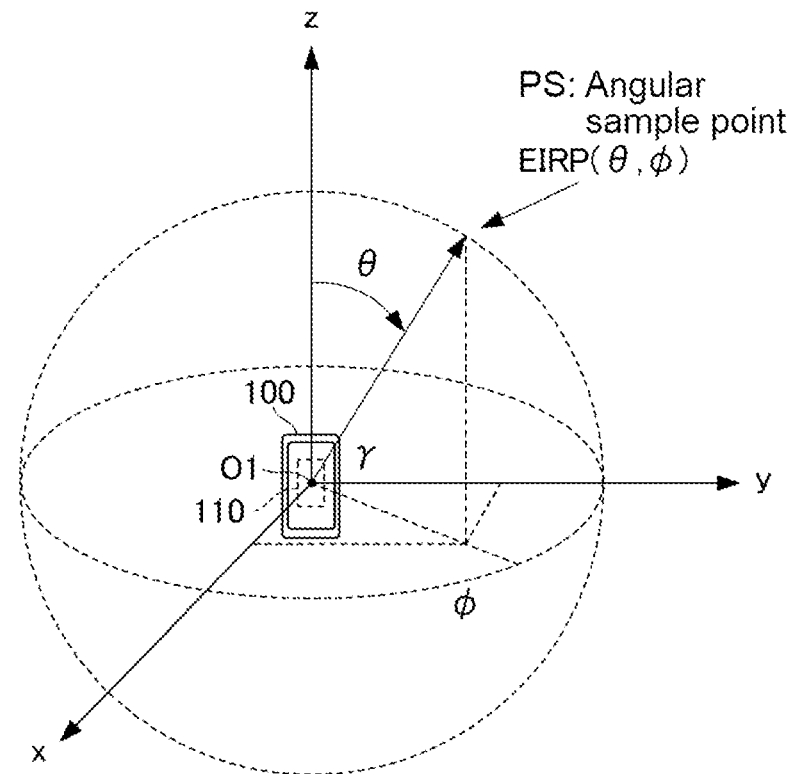
Figure 5B:
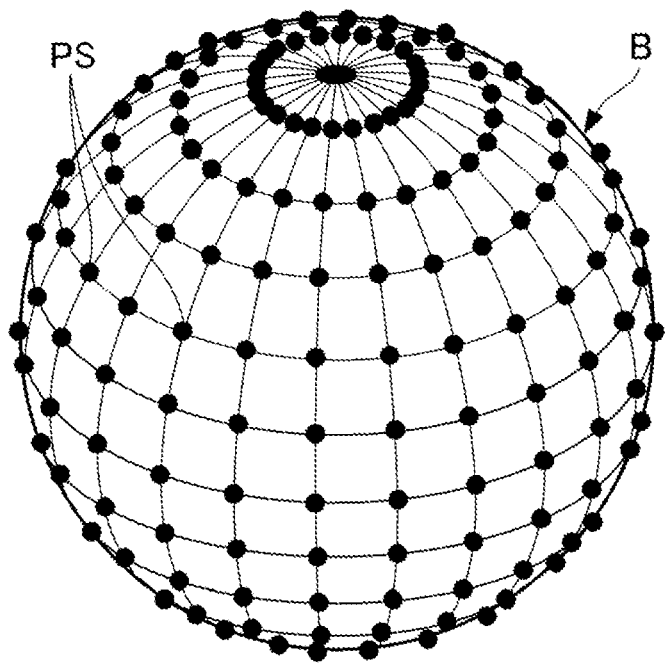

The DUT scanning mechanism 56 performs total spherical scanning which sequentially changes a posture of the DUT 100 to a state where the antenna 110 faces all orientations of a surface of the sphere while assuming that the DUT 100 mounted (held) on the mounting tray 56d is disposed, for example, at a center O1 of the sphere (refer to a sphere B in FIGS. 5A and 5B). Control of the DUT scanning in the DUT scanning mechanism 56 is performed by a DUT scanning control unit 16 which will be described later. The DUT scanning mechanism 56 and the DUT scanning control unit 16 constitute scanning means in the present invention.

The test antenna 5 is attached to a required position on the bottom surface 52a of the housing main body 52 of the OTA chamber 50 by using an appropriate holder (not shown). An attachment position of the test antenna 5 is a position at which visibility can be secured from the reflector 7 via an opening 67a provided on the bottom surface 52a. The test antenna 5 uses a radio signal in the frequency band of the same regulation (NR standard) as the antenna 110 of the DUT 100.

In a case where measurement related to the NR of the DUT 100 is performed in the OTA chamber 50, the test antenna 5 transmits a test signal from the NR system simulator 20 to the DUT 100 and receives a signal under measurement transmitted from the DUT 100 that has received the test signal. The test antenna 5 is disposed so that a light reception surface thereof becomes a focal position F of the reflector 7. The reflector 7 is not always required in a case where the test antenna 5 can be disposed so that the light reception surface thereof faces the DUT 100 and appropriate light reception can be performed.

The reflector 7 is attached to a required position on the side surface 52b of the OTA chamber 50 by using a reflector holder 58. The reflector 7 realizes a radio wave path that returns the radio signal (the test signal and the signal under measurement) transmitted and received by the antenna 110 of the DUT 100 to the light reception surface of the test antenna 5.

Subsequently, configurations of the integrated control device 10 and the NR system simulator 20 will be described.

As shown in FIG. 2, the integrated control device 10 is communicably connected to the NR system simulator 20 via a network 19 such as Ethernet (registered trademark). Further, the integrated control device 10 is also connected to a controlled system element in the OTA chamber 50, for example, the DUT scanning control unit 16 via the network 19.

The integrated control device 10 comprehensively controls the NR system simulator 20 and the DUT scanning control unit 16 via the network 19, and includes, for example, a Personal Computer (PC). The DUT scanning control unit 16 may be independently provided accompanying with the OTA chamber 50 (refer to FIG. 2), or may be provided in the integrated control device 10 as shown in FIG. 3. Hereinafter, description will be performed while assuming that the integrated control device 10 has the configuration shown in FIG. 3.

As shown in FIG. 3, the integrated control device 10 includes a control unit 11, an operation unit 12, and a display unit 13. The control unit 11 includes, for example, a computer device. The computer device includes a Central Processing Unit (CPU) 11a that performs predetermined information processing to realize the function of the measurement device 1, and performs comprehensive control on the NR system simulator 20, and the signal processing unit 25 as targets, a Read Only Memory (ROM) 11b that stores an Operating System (OS) for starting up the CPU 11a, the other programs, and control parameters, and the like, a Random Access Memory (RAM) 11c that stores execution code, data, and the like of the OS or an application which is used for an operation by the CPU 11a, an external I/F unit 11d, an input and output port (not shown), and the like.

The external I/F unit 11d is communicably connected to each of the NR system simulator 20, the signal processing unit 25, and the drive unit 56e of the DUT scanning mechanism (biaxial positioner) 56 via the network 19. An operation unit 12 and a display unit 13 are connected to the input and output port. The operation unit 12 is a functional unit for inputting various information such as commands, and the display unit 13 is a functional unit for displaying various information such as an input screen, measurement results, and the like of the various information.

The computer device described above functions as the control unit 11 in such a way that the CPU 11a executes a program stored in the ROM 11b while using the RAM 11c as a work area. As shown in FIG. 3, the control unit 11 includes a call connection control unit 14, a signal transmission and reception control unit 15, a DUT scanning control unit 16, a signal analysis control unit 17, a reception sensitivity test control unit 18. The call connection control unit 14, the signal transmission and reception control unit 15, the DUT scanning control unit 16, the signal analysis control unit 17, and the reception sensitivity test control unit 18 are also realized by executing a predetermined program stored in the ROM 11b in the work area of the RAM 11c by the CPU 11a.

The call connection control unit 14 drives the test antenna 5 via the NR system simulator 20 and the signal processing unit 25 to transmit and receive a control signal (radio signal) to and from the DUT 100, thereby performing control to establish a call (a state where the radio signal can be transmitted and received) between the NR system simulator 20 and the DUT 100.

The signal transmission and reception control unit 15 performs a control of monitoring a user operation in the operation unit 12, transmitting a signal transmission command to the NR system simulator 20 after the call is established through call connection control, by being triggered with a predetermined measurement start operation related to the measurement of transmission and reception characteristics of the DUT 100 by the user, and transmitting the test signal from the NR system simulator 20 via the test antenna 5, and a control of transmitting a signal reception command and receiving the signal under measurement via the test antenna 5.

The DUT scanning control unit 16 drives and controls the drive motors 56f and 56g of the DUT scanning mechanism 56 to perform total spherical scanning of the DUT 100 mounted on the mounting tray 56d of the DUT mounting portion 56c. In order to realize the control, for example, a DUT scanning control table 16a is prepared in the ROM 11b in advance. The DUT scanning control table 16a stores, for example, coordinates of each angular sample point PS (refer to FIG. 5B) in the spherical coordinate system (refer to FIG. 5A) related to the total spherical scanning of the DUT 100, drive data of the drive motors 56f and 56g associated with the coordinates of each angular sample point PS, and control data associated with a stop time (measurement time) at each angular sample point PS. In a case where the drive motors 56f and 56g are, for example, stepping motors, for example, the number of drive pulses is stored as the drive data.

The DUT scanning control unit 16 expands the DUT scanning control table 16a into the work area of the RAM 11c, and drives and controls the drive motors 56f and 56g of the DUT scanning mechanism 56 based on the control data stored in the DUT scanning control table 16a. As a result, the total spherical scanning of the DUT 100 mounted on the DUT mounting portion 56c is performed. In the total spherical scanning, the antenna surface of the antenna 110 of the DUT 100 is stopped for a regulated time (the stop time) toward the angular sample point PS for each angular sample point PS in the spherical coordinate system, and, thereafter, an operation of moving to a next angular sample point PS (scanning of the DUT 100) is sequentially performed while targeting all the angular sample points PS.

The signal analysis control unit 17 captures a radio signal, which is related to the NR or the LTE and is received by the test antenna 5 in a case where the total spherical scanning of the DUT 100 is performed, via the NR system simulator 20 and the signal processing unit 25, and performs an analysis process (measurement process) on the radio signal as a signal of a designated measurement item.

The reception sensitivity test control unit 18 executes a reception sensitivity test of receiving the test signal, which is transmitted from the signal generation unit 21a of the NR system simulator 20, by the DUT 100 and measuring reception sensitivity a plurality of times, and performs control to aggregate measurement results of the reception sensitivity test, which is executed the plurality of times, as test results. The reception sensitivity test control unit 18 constitutes reception sensitivity test execution means of the present invention.

As shown in FIG. 3, the reception sensitivity test control unit 18 includes a test condition setting unit 18b, a throughput measurement unit 18c, a drop state determination unit 18d, an output level variable setting unit 18e, and a measurement result output unit 18f. The test condition setting unit 18b, the throughput measurement unit 18c, the drop state determination unit 18d, the output level variable setting unit 18e, and the measurement result output unit 18f respectively constitute test condition setting means, throughput measurement means, drop determination means, output level setting means, and measurement result output means according to the present invention.

The test condition setting unit 18b is a functional unit that sets a test condition of the reception sensitivity test. The test condition set by the test condition setting unit 18b includes an initial step level SL0, a starting output level OL0, an error tolerance level (error tolerance of boundary level) EL, and a connection drop determination threshold value (connection drop threshold) DT, and the like. The initial step level SL0 indicates an initial value of a step fluctuation range of an output level of the test signal which is changed stepwise in a case of the reception sensitivity test. The starting output level OL0 indicates an output level of the DUT 100 (an output level in a case of first transmission and reception) in a case of starting the reception sensitivity test. The error tolerance level EL indicates the fluctuation range (predetermined value) between previous and current output levels of a predetermined test signal for determining whether or not to continue the reception sensitivity test on a next output level. The connection drop determination threshold value DT is a set value of a bottom value which causes drop of call connection (call drop) in case where a value is lower than the value. In an algorithm shown in FIG. 7, the output level is lowered by a large step. Therefore, in a case where the process proceeds any further, call drop occurs, so that a threshold value which does not lower the output level is necessary. The value can be preset by the user.

The throughput measurement unit 18c is a functional unit that measures a throughput related to reception capacity of the DUT 100 for each reception sensitivity test. For example, the throughput measurement unit 18c may be configured to transmit a transmission rate of the test signal to the DUT 100 in accordance with the transmission of the test signal, and to measure the throughput from the received transmission rate in accordance that the DUT 100 notifies the NR system simulator 20 of a reception result (received transmission rate) of the test signal.

The drop state determination unit 18d has a function of determining whether or not the throughput measurement result is in a dropped state to a preset proportion in the steep drop region related to the characteristic (refer to FIG. 13) in which the throughput measurement result by the throughput measurement unit 18c drops steeply. In order to realize the function, for example, the test condition setting unit 18b sets a determination condition for determining whether or not the throughput measurement result drops to a certain proportion in the steep drop region in advance. The drop state determination unit 18d determines whether or not the throughput measurement result is in the dropped state according to whether or not the measured throughput is in the steep drop region indicated by the determination condition. As the determination condition for determining whether or not the throughput measurement result is in the dropped state, for example, an example is provided in which a range which exceeds 95% and is equal to or less than 99% is set in a case where a value of the throughput, which is measured by the throughput measurement unit 18c through first test signal transmission and reception, is set to 100%. As a result, in a case where the measured throughput is in the set range, it is possible to determine the dropped state, and, in a case of a proportion higher than the range, it is possible to determine that the dropped state is not made. Here, the determination condition is not limited to a case where the value of the throughput, which is measured with the first test signal transmission and reception, is set to 100% (reference value) as described above and the range of the proportion, which exceeds 95% and is equal to or less than 99% with respect to the reference value, is set. Another range of a proportion with respect to the reference value may be set.

The output level variable setting unit 18e is a functional unit that performs variable setting, according to a comparison result between a throughput measurement result by the throughput measurement unit 18c and a predetermined threshold value (throughput threshold value) set in advance, so that an output level of a test signal in a next reception sensitivity test is in an ascending (level up) or descending (level down) direction, that is, the output levels of the test signals between the reception sensitivity tests corresponding to before and after number of times become different.

The measurement result output unit 18f is a functional unit that proceeds to the next reception sensitivity test (throughput measurement) in a case where a test result fluctuation range between a test result (throughput measurement result) of a current reception sensitivity test using the test signal, which has an output level after the variable setting, and a test result of a previous reception sensitivity test exceeds a range of a fluctuation range (EL) set by the test condition setting unit 18b, and outputs the test result in a case where the test result fluctuation range is in the fluctuation range (EL).

Figure 4:
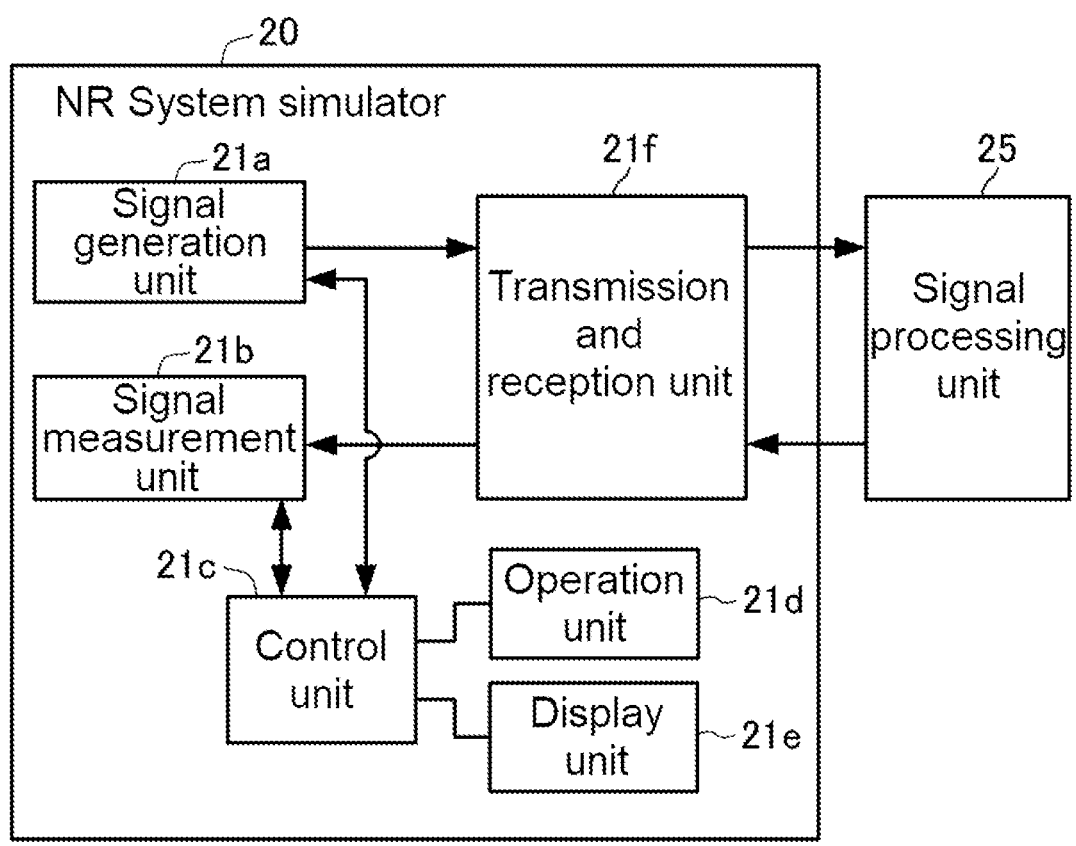
FIG. 4 is a block diagram showing a functional configuration of an NR system simulator in the measurement device according to the embodiment of the present invention.

As shown in FIG. 4, the NR system simulator 20 includes a signal generation unit 21a, a transmission and reception unit 21f, a signal measurement unit 21b, a control unit 21c, an operation unit 21d, and a display unit 21e. The NR system simulator 20 constitutes a signal generator of the present invention.

The signal generation unit 21a generates a signal (baseband signal) that becomes a source of the test signal. The transmission and reception unit 21f functions as an RF unit that generates the test signal corresponding to a frequency of each communication standard from the signal generated by the signal generation unit 21a and sends the generated test signal to the signal processing unit 25, and restores the baseband signal from the signal under measurement which is sent from the signal processing unit 25. The signal measurement unit 21b performs measurement process of the signal under measurement based on the baseband signal restored by the transmission and reception unit 21f.

The control unit 21c comprehensively controls each of the functional units including the signal generation unit 21a, the signal measurement unit 21b, the transmission and reception unit 21f, the operation unit 21d, and the display unit 21e. The operation unit 21d is a functional unit for inputting various information such as commands, and the display unit 21e is a functional unit for displaying various information such as an input screen of the various information and measurement results.

In the measurement device 1 having the above-described configuration, the DUT 100 is mounted on the mounting tray 56d of the DUT scanning mechanism 56 (biaxial positioner) in the internal space 51 of the OTA chamber 50, and it is possible to measure the measurement item, such as EIRP-CDF, EIS-CDF, or TRP, related to the radio signal of the DUT 100 while rotating the DUT 100 in biaxial (azimuth axis and roll axis) directions (while changing an angle of the positioner) for each mounting tray 56d.

Here, control (total spherical scanning) of an angle of the DUT 100 by changing the angle of the biaxial positioner, which is required in a case of measuring each of the measurement items described above, will be described with reference to FIGS. 5A and 5B and FIG. 6.

Generally, related to measurement of radiated power targeting the DUT 100, a method for measuring equivalent isotropic radiated power (EIRP) and a method for measuring total radiated power (TRP) are known. The EIRP is, for example, a power value measured at each measurement point $(\theta, \varphi)$ in a spherical coordinate system $(r, \theta, \varphi)$ shown in FIG. 5A. On the other hand, the TRP is obtained by measuring the EIRP in all orientations of the spherical coordinate system $(r, \theta, \varphi)$, that is, at a plurality of angular sample points PS (refer to FIG. 5B), which are regulated in advance, on a spherical surface equidistant from a center O1 (hereinafter, a reference point) of the total spherical scanning of the DUT 100, and obtaining a total sum thereof.

In the present embodiment, the number of divisions $N\theta$ and $N\varphi$ for calculating the total radiated power (TRP) is set to, for example, 12, respectively. As a result, in the present embodiment, the number of angular samples (N) is obtained as $N=132$ ($=(12-1)\times12$). 132 angular sample points PS obtained as above are located as shown in FIG. 5B when represented on a surface of the sphere B.

In the measurement device 1 according to the present embodiment, as shown in FIG. 5B, the EIRP is measured at positions of 132 points equidistant from the reference point of the spherical coordinate system $(r, \theta, \varphi)$, and, further, the EIRP is added at positions of all the point. Further, based on a result of addition of each EIRP, that is, a total sum of the EIRP at all the angular sample points PS of 132 points, the total radiated power (TRP) of the DUT 100 is obtained.

In a case where TRP measurement is performed, the integrated control device 10 drives and controls the DUT scanning mechanism 56 to perform the total spherical scanning of the DUT 100. In the total spherical scanning of the DUT 100, the integrated control device 10 rotationally drives the turntable 56a around the azimuth axis while repeatedly driving/non-driving the drive motor 56f, and rotationally drives the mounting tray 56d around the roll axis while repeatedly driving/non-driving the drive motor 56g. Here, the integrated control device 10 performs control so that the drive motor 56f and the drive motor 56g are non-driven at each timing in which the antenna surface of the antenna 110 faces one angular sample point PS. By controlling the total spherical scanning of the DUT 100, the DUT 100 mounted on the mounting tray 56d is rotationally driven around the reference point so that the antenna surface of the antenna 110 sequentially faces (orients) all the angular sample points PS of the sphere B while the antenna 110 is held at a position of the reference point which is the center of the sphere B that regulates the spherical coordinate system $(r, \theta, \varphi)$.

Figure 6:
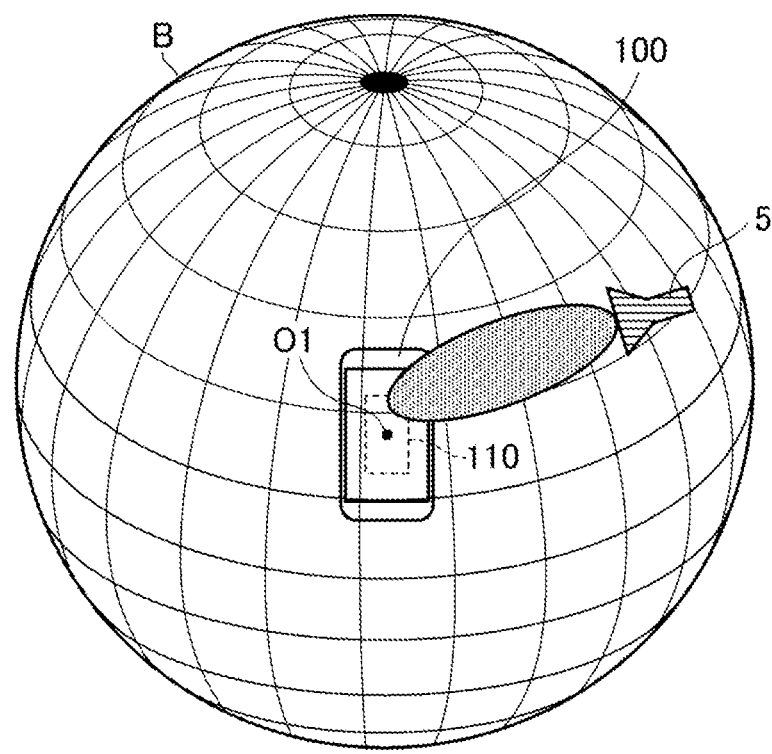
FIG. 6 is a diagram explaining a disposition mode of a test antenna 5 in the OTA chamber of the measurement device according to the embodiment of the present invention using the spherical coordinate system (r, θ, φ) shown in FIGS. 5A and 5B.

As shown in FIG. 6, the test antenna 5 is disposed at a position of a specific angular sample point PS (one point) in the spherical coordinate system $(r, \theta, \varphi)$. In the above-described total spherical scanning, the DUT 100 is driven (scanned) so that the antenna surface of the antenna 110 sequentially faces the light reception surface of the test antenna 5. As a result, the test antenna 5 can transmit and receive a signal for the TRP measurement to and from the antenna 110 of the DUT 100 on which the total spherical scanning is performed. Here, the transmitted and received signal is a test signal that is transmitted from the NR system simulator 20 via the test antenna 5, and a signal that is transmitted by the DUT 100, which has received the test signal, using the antenna 110, that is, a signal under measurement that is received via the test antenna 5.

In the integrated control device 10, in accordance that the DUT 100 is scanned so as to pass through each angular sample point PS in a φ direction while maintaining a certain angle of θ in the spherical coordinate system (r, θ, φ) shown in FIG. 5B, the NR system simulator 20 is driven to generate the test signal by the signal generation unit 21a and the transmission and reception unit 21f, and the test signal is transmitted from the test antenna 5 via the signal processing unit 25. Here, in a case where the DUT 100 receives the test signal at the antenna 110, the DUT 100 sends out a response signal corresponding to the reception of the test signal.

The integrated control device 10 further drives the NR system simulator 20 so that a signal, which is transmitted by the DUT 100 in response to the reception of the test signal and is received by the test antenna 5, is received by the signal measurement unit 21b as the signal under measurement from the signal processing unit 25 via the transmission and reception unit 21f. Further, the integrated control device 10 drives and controls the signal measurement unit 21b so as to perform signal processing related to the measurement of the EIRP based on the received signal under measurement. In a case where the measurement control of the EIRP is performed in accordance with the total spherical scanning of the DUT 100 which passes through all the angular sample points PS by changing the angle of θ, it is possible to measure the EIRP for all the angular sample points PS of the spherical coordinate system (r, θ, φ) to correspond to NR in the NR system simulator 20. Further, the integrated control device 10 can obtain the TRP which is the total sum of the EIRP measurement values for all the angular sample points PS.

Further, the integrated control device 10 has an output level control function of adjusting the output level (power level) of the test signal in the NR system simulator 20 to an appropriate level regulated by, for example, the 3GPP standard before performing a performance test of the DUT 100, which is performed while changing an angle of the biaxial positioner (DUT scanning mechanism 56) in the OTA chamber 50, specifically, for example, measurement of measurement items such as EIRP-CDF, EIS-CDF, and TRP. With the output level control function, the output level of the test signal, at which the DUT 100 can exhibit maximum ability in a case of the measurement of each of the items, is searched. Therefore, the above-described output level control function by the NR system simulator 20 can be regarded as a control function related to the reception sensitivity test for searching for the reception sensitivity for the DUT 100. The control function related to the reception sensitivity test is realized by the reception sensitivity test control unit 18 provided in the control unit 11 of the integrated control device 10.

(Method for Reducing Time of Reception Sensitivity Test)

In the integrated control device 10, the reception sensitivity test control unit 18 controls the reception sensitivity test of the DUT 100 by transmitting and receiving the test signal a plurality of times between the NR system simulator 20, which is the signal generator, and the DUT 100. In the control, a throughput is measured according to the transmission and reception of the test signal at each time during the reception sensitivity test so as to be converged to an output level, at which an appropriate value of the throughput (measurement result) is obtained, while performing level down or level up on the output level of the test signal according to the comparison result between the throughput measurement value and the throughput threshold value.

Figure 15:
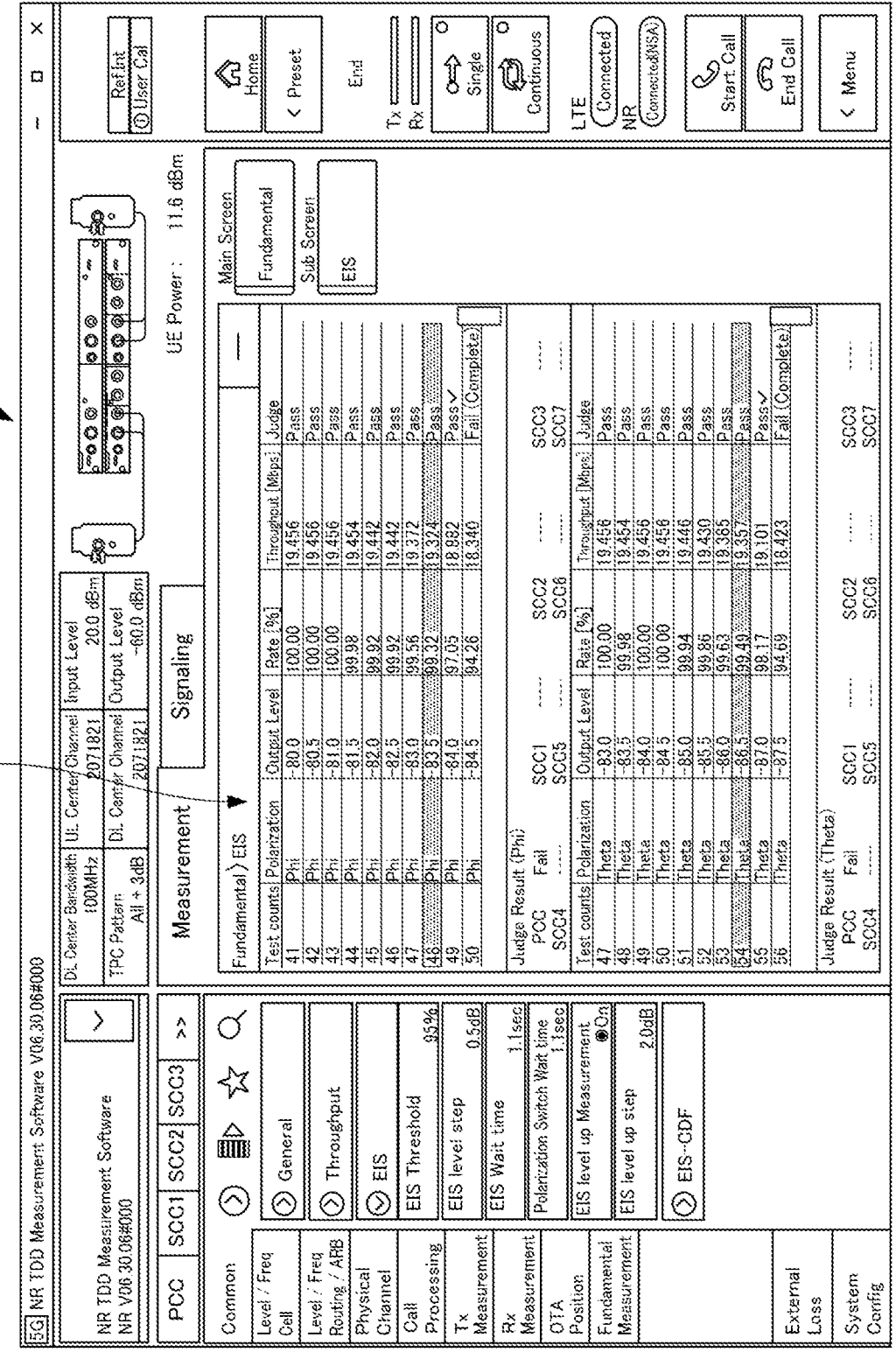
FIG. 15 is a diagram showing a display example of a reception sensitivity test result of a DUT based on variable setting control of an output level of a test signal according to the related art.

As an example of a method for reducing a test time of the reception sensitivity test, a method is conceivable for performing control so that the output level is linearly fluctuated while repeatedly performing the level down or level up on the output level of the test signal without performing sequential change (linear change) by a constant level as the number of measurements increases from an initially set output level (refer to a test result display area 135b of FIG. 15).

Figure 11:
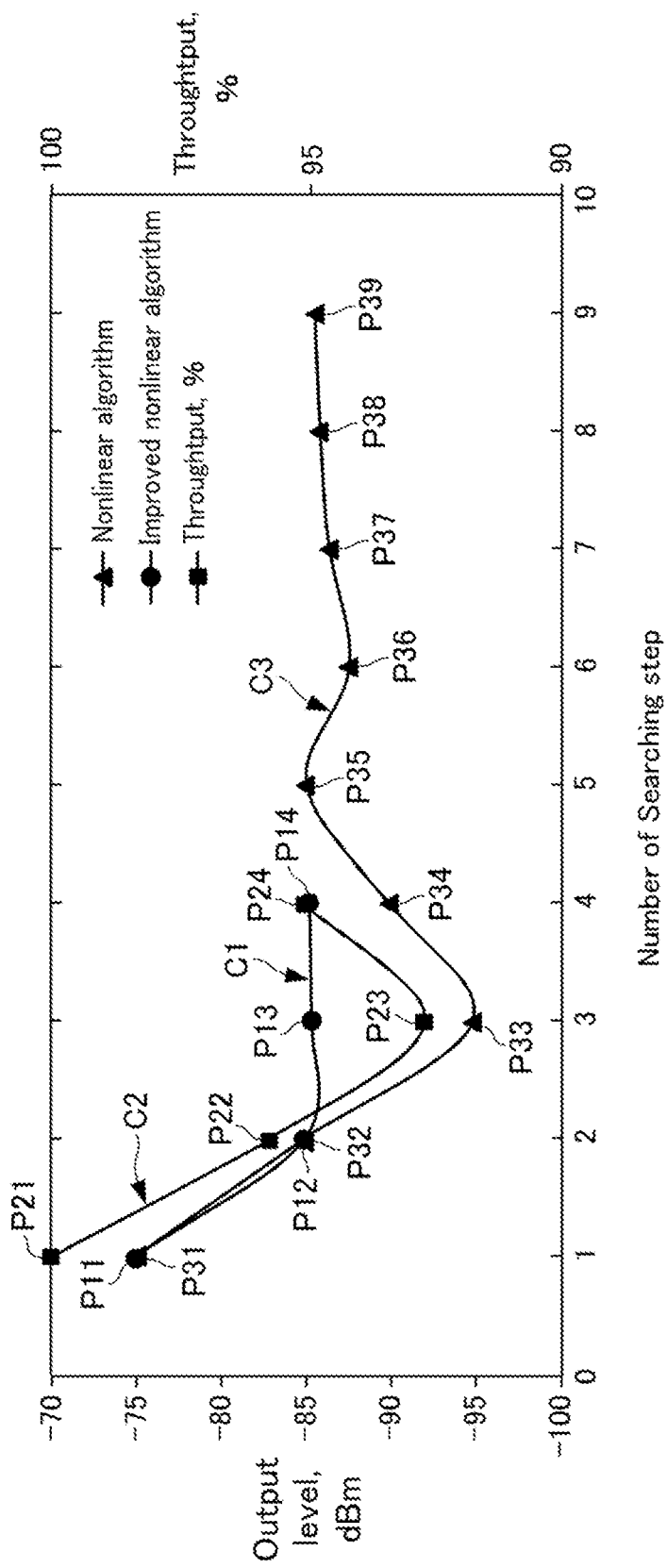
FIG. 11 is a graph showing the relationship between the number of measurements and the measurement value of each of the output level of the test signal and the throughput related to the reception sensitivity test of the DUT of the measurement device according to the embodiment of the present invention.

The measurement device 1 according to the present embodiment is premised that the output level of the test signal related to the reception sensitivity test of the DUT 100 is non-linearly controlled, and a relationship between the number of measurements related to the control and each of the measurement values of the output level of the test signal and throughput is shown as a table diagram of FIG. 10 and a graph of FIG. 11.

In the table diagram shown in FIG. 10, first and third to fifth columns from the left show data examples of test signal output level control according to the present embodiment. Further, in the table diagram, the first and second columns from the left show data examples of existing test signal output level control in the sense of being compared with the present embodiment. Similarly, in the graph shown in FIG. 11, graphs corresponding to the data examples of the test signal output level control according to the present embodiment in FIG. 10 are shown using reference numeral C1 (graph showing a relationship between the number of measurements and the output level) and reference numeral C2 (graph showing a relationship between the number of measurements and throughput), and a graph corresponding to the data example of the existing test signal output level control in FIG. 10 is shown using reference numeral C3 (graph showing the relationship between the number of measurements and the output level).

Focusing on the data examples in the first and second columns from the left of the table diagram shown in FIG. 10 and the characteristic C3 of the graph shown in FIG. 11, in the existing test signal output level control, for example, the variable level control is performed in a pattern in which the output level of the test signal is sequentially lowered by 10 dB intervals for each one measurement from first to third measurements, and the output level is sequentially raised or lowered by half the previous level after fourth measurement. Further, until a test end condition (refer to step S5 in FIG. 7) in which a difference from the previous output level is less than the error tolerance level EL set in advance is satisfied, a total of nine steps, which are shown using P31 to P39 in FIG. 11, are increased as the number of tests. In a case where the throughput measurement result is simply compared with the throughput threshold value and the output level of the test signal is non-linearly controlled using the comparison result until the above-described test end condition is satisfied, it is clarified that there is a limit to the effect of reducing the time required to reach a desired output level.

(Parameter Newly Adopted in Reception Sensitivity Test)

Therefore, in the present embodiment, as the parameters to be adopted in the reception sensitivity test, a state where the value of the measured throughput drops to a certain proportion with respect to a value (100%) determined as a reference is further added in addition to the throughput measurement result and the comparison result with the throughput threshold value, and thereafter, the output level variable setting is executed to reduce the number of measurements of the reception sensitivity test.

Figure 13:
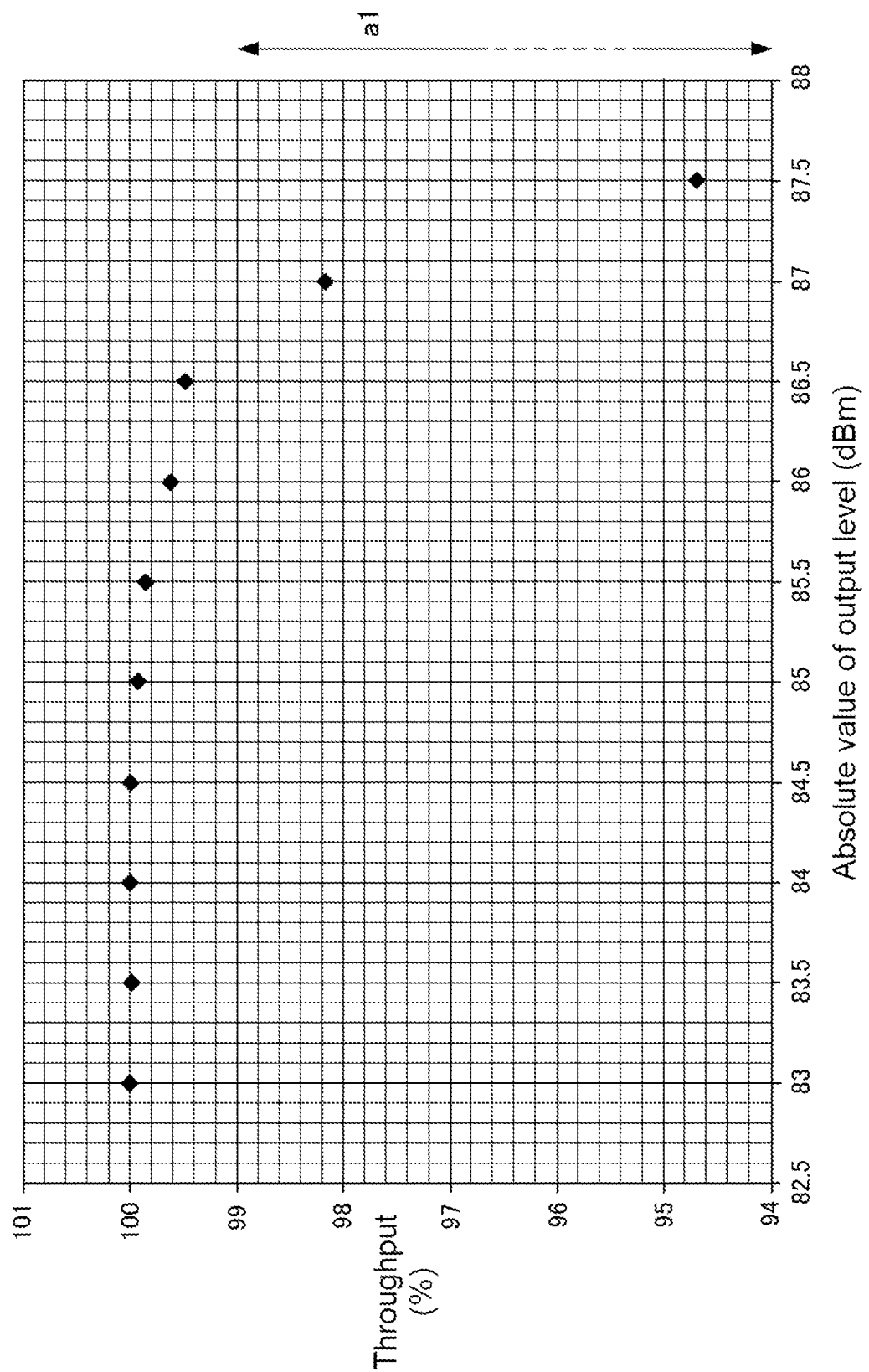
FIG. 13 is a graph showing the relationship of the output level of the test signal with respect to the throughput measurement value according to the reception sensitivity test of the DUT of the device according to the related art.

FIG. 13 shows a graph of fluctuation characteristic of the output level of the test signal with respect to the throughput measurement value according to the reception sensitivity test of the DUT of a device according to the related art. The fluctuation characteristic shown in the graph in FIG. 13 is a basis for adopting a drop state determination condition of the throughput measurement value in step S7 introduced as a check point (CP) in output level variable setting control shown in FIG. 7. In FIG. 13, reference numeral a1 indicates the steep drop region in which the throughput drops steeply. The graph shown in FIG. 13 is derived from the reception sensitivity test result (refer to FIG. 15) of the DUT 100 in the device according to the related art, and represents that the throughput measurement value steeply drops in the steep drop region a1. The example represents that, for example, in a case where a first throughput measurement value is set to 100% and the throughput measurement value is equal to or less than 99%, a throughput measurement value thereafter drops steeply.

In view of the throughput fluctuation characteristics, in the present embodiment, the throughput measurement value during the reception sensitivity test of the DUT 100 is monitored, and a checkpoint (CP) is provided to check whether or not the throughput measurement value is in a situation in which the throughput measurement value drops steeply using the determination condition set in advance. Further, in a case where the determination condition is satisfied at the CP (corresponding to step S7 in FIG. 7), that is, in a case where the throughput measurement value is a value in the steep drop region a1, a unique setting pattern, which is different from the setting pattern (refer to step S8a of FIG. 7) under the situation in which the throughput measurement value drops steeply, is applied in a case where the next output level of the test signal is set (also, refer to step S8b).

Figure 7:
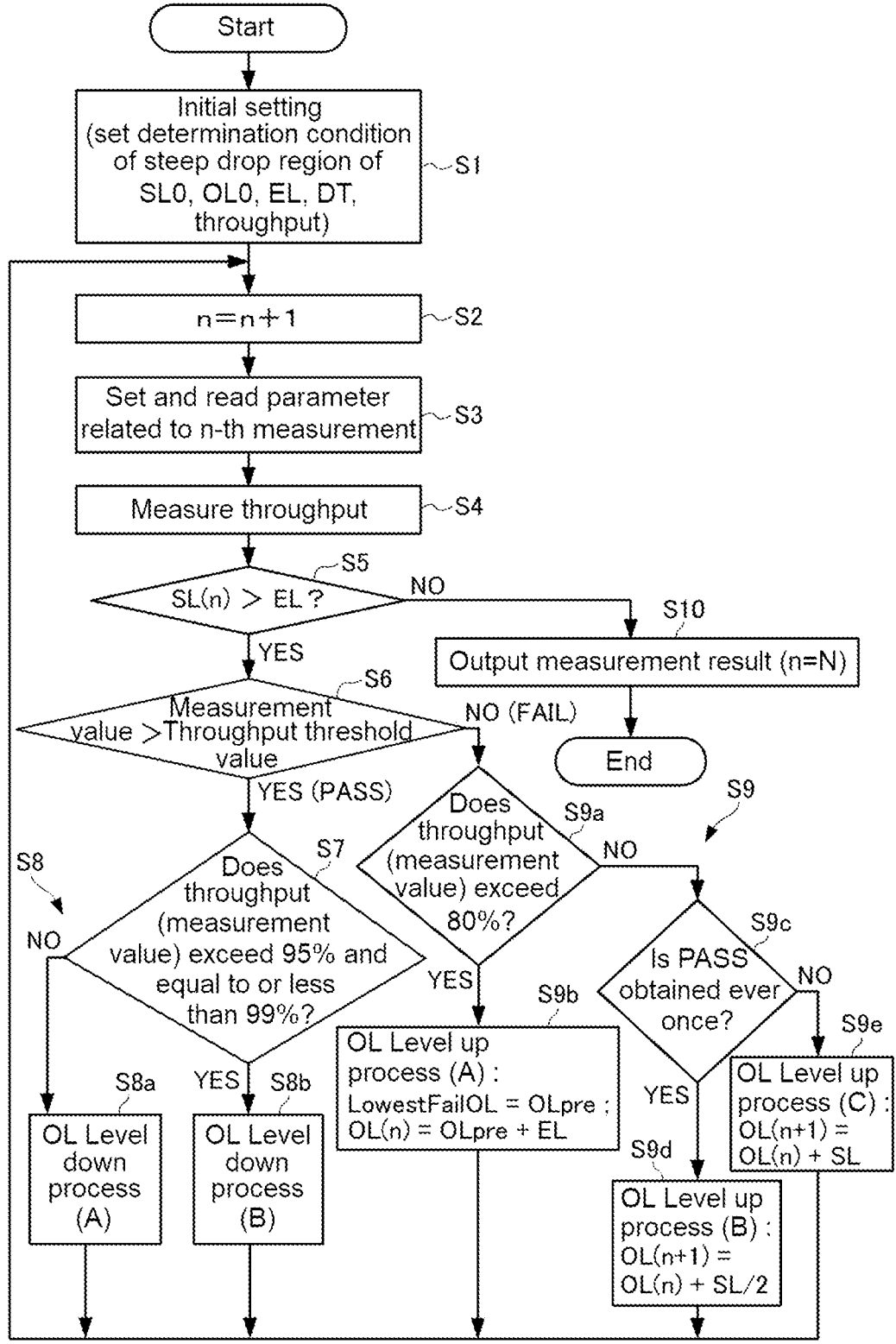
FIG. 7 is a flowchart showing a variable setting control operation of an output level of a test signal, to which CP related to the reception sensitivity test of a DUT is introduced, by the measurement device according to the embodiment of the present invention.

The unique setting pattern applied in the present embodiment is conditional upon a setting pattern in which, in a state where the throughput measurement value is dropped to a value in the steep drop region a1 in the graph of FIG. 13, the number of transmissions and receptions of the test signal related to the reception sensitivity test is reduced to the utmost, and which speedily reaches to a reception sensitivity test end condition by the error tolerance level EL (refer to step S5 in FIG. 7).

In the present embodiment, as an example of the above-described unique setting pattern, a pattern (refer to step S8b in FIG. 7) is adopted in which, in a case where the determination condition is satisfied at the CP (YES in step S7 of FIG. 7), a value, which is obtained by performing level down on the output level of the test signal by a value (2EL) twice the error tolerance level EL from the previous output level OL(OLpre), is set as a next output level OL(OL(n)) of the test signal.

The output level setting based on the unique setting pattern is an example in a case where a comparison result indicating that the throughput measurement result exceeds the threshold value is obtained and the throughput measurement result (measurement value) is a value in the steep drop region a1. Regarding the output level setting based on the unique setting pattern, in the present embodiment, thereafter, in a case where the comparison result indicating that the throughput measurement result is less than the threshold value is obtained, a pattern is used together in which a value, which is obtained by performing level up on the output level of the test signal by the value of the error tolerance level EL from the previous output level OL(OLpre), is set as the next output level OL(OL(n)) of the test signal (refer to FIG. 8B).

Based on the above-described method for reducing the time of the reception sensitivity test of the DUT 100 and the parameters (fluctuation characteristics of the throughput measurement value) newly added in the reception sensitivity test, a variable setting control operation of the output level of the test signal according to the reception sensitivity test of the DUT 100 by the integrated control device 10 of the measurement device 1 according to the present embodiment will be described below with reference to FIGS. 7 to 12.

Figure 8A:
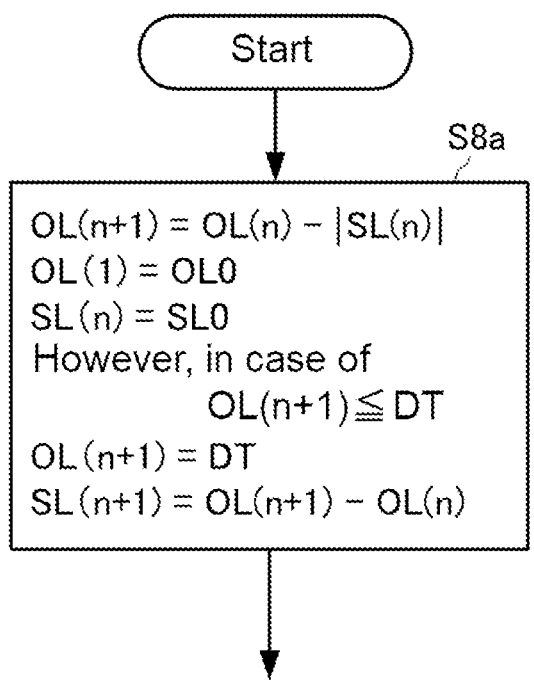
Figure 8B:
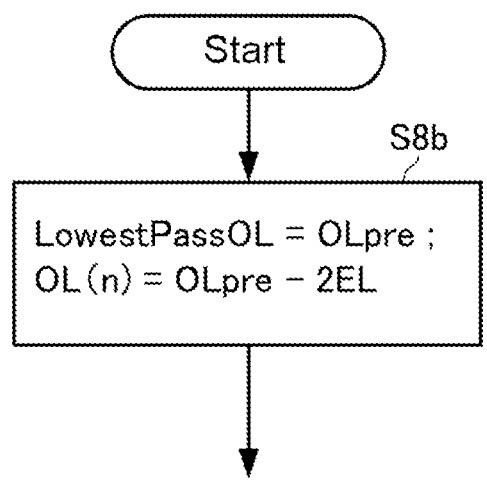

FIG. 7 is a flowchart showing a flow of the variable setting control operation of output level. In FIG. 7, a process in step S7 is performed at a timing corresponding to the above-described CP. As the determination condition for determining whether or not the throughput measured in step S4 is in in the steep dropped state (refer to the steep drop region a1 in FIG. 13), for example, a condition is applied that the throughput measurement value exceeds 95% and is equal to or less than 99% with respect to the reference value (for example, the value of the measured throughput value through the first transmission and reception. In a case of the first transmission and reception, measured throughput value is stored as 100%). Further, step S8b corresponds to a next output level setting process performed by applying the above-described unique setting pattern when it is determined that the determination condition is satisfied in step S7 (YES in step S7), that is, the level down process (B). Details of the level down process (B) are shown in FIG. 8B.

Further, in FIG. 7, a process in step S9a is a processing step which is executed at a check point according to the above-described CP in the level up process of the test signal (refer to step S9 of FIG. 7), and which is used to determine whether or not the throughput measured in step S4 is in the steep dropped state by using a determination condition different from the above-described level down process. In step S9a, as the determination condition for determining whether or not the throughput is in the steep dropped state, for example, a condition is applied that the throughput measurement value exceeds 80% with respect to the reference value. In a case where the determination condition is satisfied (YES in step S9a), a level up process (A) is performed, and, in a case where the determination condition is not satisfied (NO in step S9a), a level up process (B) of the output level (OL) or a level up process (C) is performed.

In a case where the reception sensitivity test of the DUT 100 starts along the flow chat shown in FIG. 7, first, the reception sensitivity test control unit 18 in the control unit 11 of the integrated control device 10 sets the test conditions (step S1). Specifically, the test condition setting unit 18b receives an operation input in the operation unit 12, and sets, for example, respective values of the initial step level SL0, the starting output level OL0, the error tolerance level EL, the connection drop determination threshold value DT, and the determination condition (refer to steps S7 and S9a) of the steep drop region of the throughput, which are described above.

Setting content of the test condition in step S1 assumes an operation of starting the first throughput measurement from a state where the DUT 100 is operated at the starting output level OL0, measuring the throughput at the output level obtained by lowering the fluctuation range by a width of an initial step level from the previous output level from the next measurement, and ending the measurement by determining a state where a step level SL(n) of the test signal is equal to or less than the error tolerance level EL in an n-th measurement while repeatedly performing a process of lowering the output level of the test signal (refer to the output level (OL) down processes (A) and (B)) in a case where the measured throughput is larger than the threshold value (throughput threshold value) and a process of raising the output level of the test signal (refer to the OL level up processes (A), (B), and (C)) in a case where the throughput is equal to or larger than the throughput threshold value. Further, in the operation, it is assumed that the CP (refer to step S7 in FIG. 7) is provided to check whether or not the throughput measurement value is in a situation in which the throughput measurement value drops steeply using the determination condition set in advance, and, in a case where the throughput measurement value is in the situation in which the throughput measurement value drops steeply, the next output level of the test signal is set by applying the above-described unique setting pattern (also refer to step S8b).

As the starting output level OL0 and the initial step level SL0, which are set in step S1, for example, −75 dBm and 10 dB are assumed, respectively. The error tolerance level EL is assumed to be, for example, 0.2 dB. The connection drop determination threshold value DT is assumed to be, for example, −90 dBm. Further, as the determination condition of the steep drop region of the throughput, for example, a condition is assumed that the throughput measurement value is set to a range of a proportion which exceeds 95% and is equal to or less than 99% with respect to the reference value.

After the setting of the test condition in step S1 is completed, the reception sensitivity test control unit 18 of the integrated control device 10 increments the number of measurements n by +1 (step S2), and performs a process of setting a parameter related to the N-th measurement, and reading a value of the output level OL set in step S8 (including steps S8a and S8b) of performing, for example, the OL level down process or step S9 of performing the OL level up process before the setting (step S3). Subsequently, the reception sensitivity test control unit 18 performs control to perform the n-th measurement related to the throughput of the DUT 100 while transmitting the test signal based on the parameter, which is set (or read) in step S3, related to the measurement (step S4).

As a specific example of the control in steps S3 and S4 (throughput measurement control), the reception sensitivity test control unit 18 sets, as the parameter related to a first measurement, for example, the starting output level OL0 based on the setting of the test condition in step S1, and performs the throughput measurement while driving and controlling the DUT 100 at the starting output level OL0.

Next, the reception sensitivity test control unit 18 checks whether or not a step level interval with respect to the previous throughput measurement related to the current throughput measurement, that is, the step level SL(n) is larger than the error tolerance level EL which is set in step S1 (step S5). When it is determined that the step level SL(n) is larger than the error tolerance level EL (YES in step S5), the reception sensitivity test control unit 18 proceeds to step S6 and continues the throughput measurement and step level search control. As described above, a first throughput measurement is started from the transmission of the test signal at the starting output level OL0, and there is no fluctuation range of SL with respect to the previous measurement, so that the process of step S5 is skipped and the process proceeds to step S6.

In step S6, the reception sensitivity test control unit 18 compares the throughput (measurement value) of the DUT 100, which is measured in step S4, with a preset throughput threshold value, and determines whether or not the throughput is equal to or larger than the throughput threshold value. Here, setting is performed so that the throughput threshold value is 95%, the throughput which is equal to or larger than 95% is in a permissible range (PASS), and the throughput which is lower than 95% is out of the permissible range (FAIL).

Here, when it is determined that the throughput measurement value is equal to or larger than the throughput threshold value (the state of "PASS" in step S6), the drop state determination unit 18d then determines whether or not the throughput measurement value satisfies the determination condition of the range of the proportion which exceeds 95% and is equal to or less than 99% with respect to the reference value (step S7). Here, when it is determined that the throughput measurement value exceeds 99% with respect to the reference value and the determination condition is not satisfied (NO in step S7), the reception sensitivity test control unit 18 executes the OL level (output level) down process (A) of lowering the output level of the test signal (step S8a). As shown in FIG. 8A, in the OL level down process (A), a process of lowering the output level by a step of the initial step level SL0 from a previous OL(OL(n)) is executed on a next output level OL(n+1). As the first output level OL(1), setting is performed so that OL(1)=OL0.

Further, when it is determined, by the drop state determination unit 18d, that the throughput measurement value is in the range of the proportion which exceeds 95% and is equal to or less than 99% with respect to the reference value (steep drop region a1) and the above determination condition is satisfied (YES in step S7), the reception sensitivity test control unit 18 executes the OL level down process (B) (step S8b). As shown in FIG. 8B, in the OL level down process (B), a process is executed of defining the previous output level (OLpre) as the lowest output level (Lowest Pass OL) in a case of PASS determination, and setting the next OL level (OL(n)) to a value (OLpre−2EL) obtained by lowering the level (2EL) corresponding to twice the error tolerance level EL from the previous output level (OLpre).

After executing the process in step S8a or step S8b, the reception sensitivity test control unit 18 increments the number of measurements n by +1 (step S2), and sets and reads the parameter related to the n-th measurement (step S3). As a result, after the process in step S8a, the OL level that is leveled down by the initial step level SL0=10 dB from the previous OL level is set. After the process in step S8b, the OL level that is leveled down by a value corresponding to 2EL from the previous OL level is set, and the throughput measurement is performed based on the test signal each having the set OL level (step S4).

On the other hand, when it is determined that the throughput (measurement value) is equal to or less than the throughput threshold value (in a state of "FAIL" in step S6) in step S6, the reception sensitivity test control unit 18 performs the determination process in step S9a, and further executes any the OL level up processes (A), (B), and (C) of raising the output level of the test signal based on the determination result (step S9).

After it is determined to be "FAIL" in step S6, the reception sensitivity test control unit 18 first determines whether or not the determination condition that the throughput measurement value exceeds 80% with respect to the reference value is satisfied (step S9a).

Here, when it is determined that the throughput measurement value exceeds 80% with respect to the reference value and the determination condition is satisfied (YES in step S9a), the reception sensitivity test control unit 18 executes the OL level up process (A) of lowering the output level of the test signal (step S9b).

In the OL level up process (A), a process is executed of defining the previous output level (OLpre) as the lowest output level (Lowest Fail OL) in a case of FAIL determination, and setting the next OL level (OL(n)) to a value (OLpre+EL) obtained by raising the level (EL) corresponding to the error tolerance level EL from the previous output level (OLpre).

On the other hand, when it is determined that the throughput measurement value is equal to or less than 80% with respect to the reference value and the determination condition is not satisfied (NO in step S9a), the reception sensitivity test control unit 18 checks whether or not PASS is obtained even once so far (step S9c). When it is determined that PASS is obtained even once (YES in step S9c), an OL level up process (B) is executed (step S9b). In the OL level up process (B), a process of raising the output level by a half step of the step level SL from the previous OL(n) is executed on the next output level OL(n+1).

In a case where it is determined that the PASS is not obtained ever once (NO in step S9c), an OL level up process (C) is executed (step S9c). In the OL level up process (C), a process of raising the output level by a step of the step level SL0 from the previous output level OL(n) is executed on the next output level OL(n+1)

After executing the process in step S9, that is, any of the OL level up processes (A), (B), and (C), the reception sensitivity test control unit 18 increments the number of measurements n by +1 (step S2), and sets and reads the parameter related to the n-th measurement (step S3). As a result, after the process in step S9, the OL level that is leveled up by a value corresponding to the error tolerance level EL from the previous OL level is set, and the throughput measurement is performed based on the test signal having the set OL level (step S4).

After executing the throughput measurement in step S4, the reception sensitivity test control unit 18 checks whether or not the step level interval with respect to the previous throughput measurement, that is, the step level SL(n) is larger than the error tolerance level EL which is set in step S1 (step S5). Here, when it is determined that the step level SL(n) is equal to or less than the error tolerance level EL (NO in step S5), the reception sensitivity test control unit 18 stops the throughput measurement and a step level search (step S10), and, thereafter, ends a series of measurement operations.

In step S10, the measurement result output unit 18f displays a measurement screen 130a (refer to FIG. 14), which includes the measurement result so far, such as information indicating transition of the first to N-th throughput measurement results while the number of throughput measurements in a case where the measurement operation is ended is set to N times, on the display unit 13.

According to a series of measurement controls shown in FIG. 7, it is determined whether or not the determination condition that the throughput measurement value at a processing timing corresponding to CP (refer to step S7) is in the range of the proportion which exceeds 95% and is equal to or less than 99% with respect to the reference value is satisfied. In a case where the throughput measurement value satisfies the determination condition, the process proceeds to step S8b, thereby performs the level down process (B) of performing level down on the output level of the test signal by the value corresponding to 2EL from the previous OL level using the unique setting pattern that does not depend on the setting pattern in step S8a in a case where the determination condition is not satisfied. The level down process (B) operates to reduce the number of transmissions and receptions of the test signal related to the reception sensitivity test, and to reach a state which satisfies the reception sensitivity test end condition (refer to step S5) by the error tolerance level EL with a smaller number of throughput measurements.

Hereinafter, the operation will be verified with reference to FIGS. 9 to 12.

FIG. 9 shows a data example of the parameter related to the output level of the test signal, which is set according to the number of measurements by the output level variable setting control (refer to FIG. 7) by the measurement device 1 according to the present embodiment. The example of FIG. 9 shows, for example, with respect to each of the total four number of measurements, a relationship of the output level of the test signal of the measurement, the measured throughput, the determination result based on the determination condition of the steep drop region of the throughput measurement value, the fluctuation range of the output level between the previous measurement and the current measurement, a setting process type of the next output level, and the next output level of the test signal.

FIG. 11 shows the characteristic C1 related to the output level of the test signal with respect to the number of measurements according to the reception sensitivity test of the DUT 100 by the measurement device 1 according to the present embodiment, and the characteristic C2 related to the throughput (measurement value) with respect to the number of measurements. The characteristics C1 and C2 are based on the data examples shown in FIG. 10 (refer to the first and third to fifth columns from the left), respectively. That is, in FIG. 11, the characteristic C1 gives an example in which the total four number of throughput measurements (output level variable setting), which are indicated by the reference numerals P11 to P14, are performed and the reception sensitivity test is ended.

As shown in the characteristic C1 in FIG. 11 and FIGS. 9 and 10 (refer to the first to third columns from the left), in the measurement device 1 according to the present embodiment, in a first measurement, the test is started with the DUT 100 while setting the output level OL(1)=−75 dBm at the measurement point P11 of the characteristic C1. Since the throughput measured at this time is a value higher than the throughput threshold value and is determined to be in the permissible range (PASS), the process proceeds to the determination process based on the determination condition of the steep drop region of the throughput measurement value. Here, a determination result ("NO") is obtained that the throughput measurement value is outside the region of the steep drop region a1 and the determination condition is not satisfied, and the process proceeds to the OL level down process (A) (refer to step S8a in FIG. 7).

In the OL level down process (A), the initial step level SL0 (=−10 dB), which functions as the step level SL(1), is set to be leveled down from the output level OL(1)=−75 dBm, and (OL(1)−SL(1))=−85 dBm is set as a second output level OL(2).

Subsequently, in a second measurement, the test of the DUT 100 is continued with the output level OL(2)=−85 dBm at the measurement point P12 of the characteristic C1. Since the throughput measured at this time became a value higher than the throughput threshold value and is determined to be in the permissible range (PASS), the process proceeds to the determination process based on the determination condition of the steep drop region of the throughput measurement value. Here, a determination result ("YES") in which the throughput measurement value is a value in the region of the steep drop region a1 and satisfies the determination condition is obtained, and the process proceeds to the OL level down process (B) (refer to step S8b of FIG. 7 and FIG. 8B).

In the OL level down process (B), the output level OL(2)=−85 dBm is set to level down 2EL=0.4 dB, which is twice the value of the error tolerance level EL, and (OL(2)−2EL)=−85.4 dBm is set as a third output level OL(3).

Subsequently, in a third measurement, the test of the DUT 100 is continued with the output level OL(3)=−85.4 dBm at the measurement point P13 of the characteristic C1. Since the throughput measured at this time is a value less than the throughput threshold value and is determined to be out of the permissible range (FAIL), the process proceeds to the OL level up process (A) (refer to step S9b in FIG. 7).

In the OL level up process (A), 0.2 dB, which is the value of the error tolerance level EL, is set to level up from the output level OL(3)=−85.4 dBm, and (OL(3)+EL)=−85.2 dBm is set as a fourth output level OL(4).

Subsequently, in a fourth measurement, the test of the DUT 100 is continued with the output level OL(4)=−85.2 dBm at the measurement point P14 of the characteristic C1. Here, a difference (absolute value) between the current output level OL(4) and the output level OL(3) set at the third measurement is (85.2-85.4)=0.2 dB. Therefore, the value of the difference is equal to or less than the error tolerance level EL, and the end condition (SL(n) EL; NO in step S5 of FIG. 7) of the output level variable setting control (reception sensitivity test) is satisfied, so that the reception sensitivity test is ended.

As shown in the characteristic C1 and FIGS. 9 and 10 (refer to the first and third to fifth columns from the left), in the measurement device 1 according to the present embodiment, it is checked whether or not the throughput measurement value at the CP is in the steep drop region a1. In a case where the throughput measurement value is in the steep drop region a1, the level down process (refer to step S8b in FIG. 7) and the level up process (refer to step S9 in FIG. 7) which are performed when the next output level is set, are performed in units of the error tolerance level EL, so that it is possible to realize the reception sensitivity test with four measurements.

On the other hand, in the existing test signal output level control, to which a technology for performing the level down or level up in units of the error tolerance level EL is not introduced when the above-described CP and the throughput measurement value are in the steep drop region a1, for example, a total of nine measurements are necessary using the measurement points P31 to P39 until the end of the reception sensitivity test, as shown using the characteristic C3 in FIG. 11 (in addition, refer to the first and second columns from the left in FIG. 10). According to the test signal output level control, to which the CP according to the present embodiment, the level down process in step S8b of FIG. 7, and the level up process in step S9b of FIG. 7 are introduced, the effect of reducing the number of measurements by 2.25 (=9/4) times can be expected with respect to the existing test signal output level control.

Figure 12:
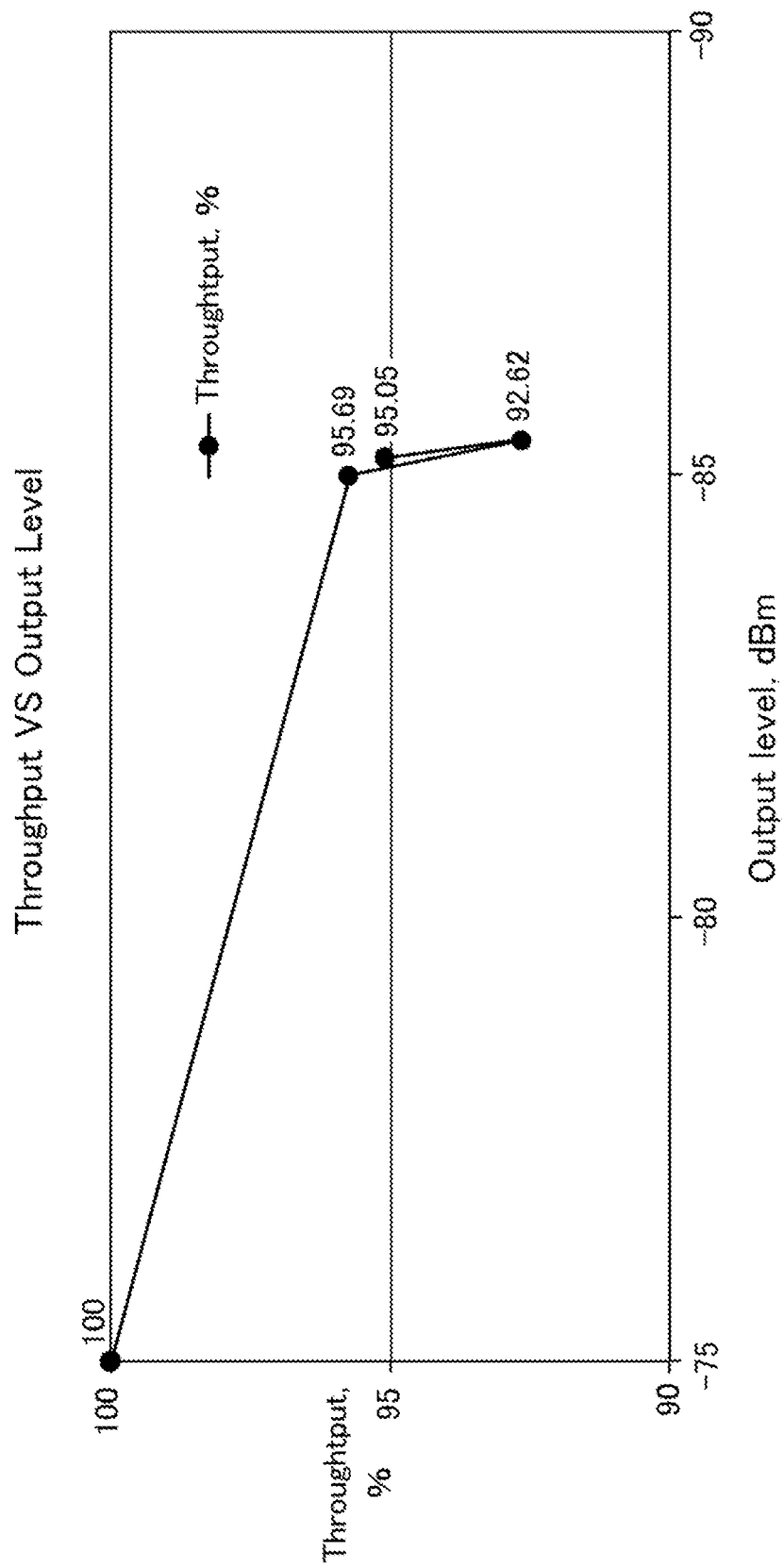
FIG. 12 is a graph showing an example of a characteristic related to the output level of the test signal and the measured throughput related to the reception sensitivity test of the DUT of the measurement device according to the embodiment of the present invention.

FIG. 12 shows an example of the characteristics related to the measured throughput with respect to the output level in the variable setting control of the output level according to the present embodiment, to which the CP and the technique for performing level down or level up in units of the error tolerance level EL when the throughput measurement value is in the steep drop region a1 are introduced (refer to FIG. 7). According to a graph shown in FIG. 12, since the CP and the technique for performing level down or level up in units of the error tolerance level EL when the throughput measurement value is in the steep drop region a1 are introduced, it is possible to understand that a high throughput point can be omitted because the throughput measurement value at a second measurement point drops steeply.

Figure 14:
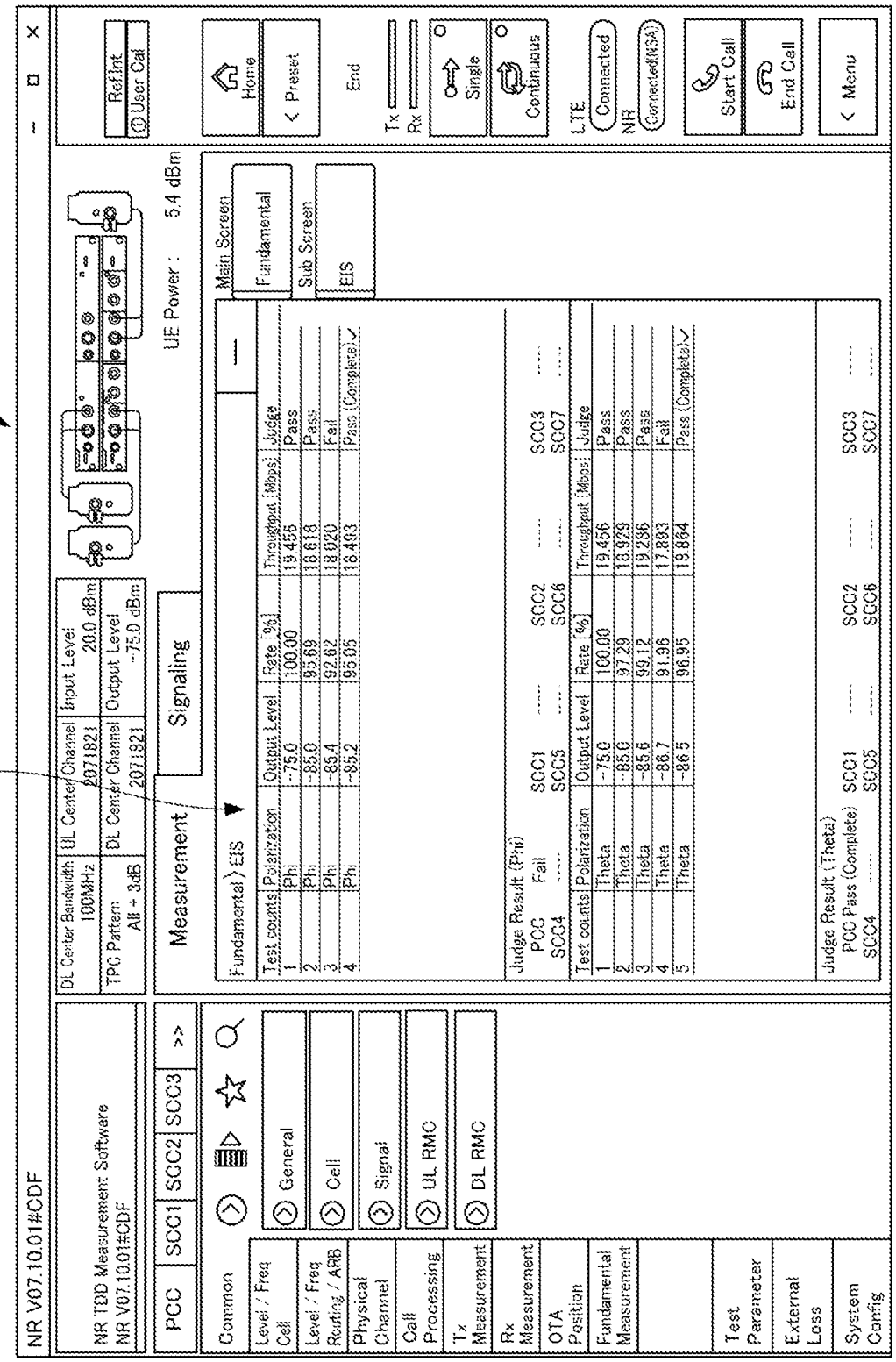
FIG. 14 is a diagram showing a display example of a reception sensitivity test result of the DUT based on variable setting control of the output level of the test signal to which the CP is introduced by the measurement device according to the embodiment of the present invention.

FIG. 14 is a diagram showing a display example of the reception sensitivity test result of the DUT 100 by the measurement device 1 according to the present embodiment. During the reception sensitivity test operation control of the DUT 100 according to the flowchart shown in FIG. 7, the display unit 13 of the integrated control device 10 displays, for example, the measurement screen 130a having a screen configuration shown in FIG. 14. The measurement screen 130a includes a test result display area 130b that displays the throughput measurement result (reception sensitivity) of the DUT 100 according to the number of measurements. According to the measurement device 1 according to the present embodiment, in the test result display area 130b on the measurement screen 130a, the measurement results of the four times of throughput measurements accompanied by the fluctuation of the step level SL of the characteristic C1 shown in FIG. 11 are displayed in a mode of being arranged in chronological order according to the passage of time in a downward direction from an upper part in FIG. 14.

FIG. 15 shows a display example of the reception sensitivity test results of the DUT 100 in a device according to the related art in order to compare with the display example of the reception sensitivity test results of the DUT 100 by the measurement device 1 according to the present embodiment. As shown in FIG. 15, a measurement screen 135a of a device according to the related art has a test result display area 135b. In the test result display area 135b, for example, the measurement results of 10 times of throughput measurements accompanied by a linear fluctuation of the step level SL are displayed in a mode of being arranged in chronological order according to the passage of time in the downward direction from the upper part in FIG. 15.

In the above embodiment, the reception sensitivity test operation control specialized for the measurement on a single surface (EIS measurement) is illustrated. However, the present embodiment can be applied to a reception sensitivity test related to the measurement on the entire spherical surface (TRP measurement: refer to FIGS. 5A and 5B).

Further, the above embodiment discloses a system configuration example in which the integrated control device 10 is provided outside the measurement device 1. However, the present invention may have a configuration in which the measurement device 1 is provided with a control function of the integrated control device 10.

As described above, the measurement device 1 according to the present embodiment has a configuration including the NR system simulator 20 that generates the test signal, and the reception sensitivity test control unit 18 that executes the reception sensitivity test of measuring (calculating) the reception sensitivity of a certain DUT 100 which is the device under test by repeating transmission and reception of the test signal from the NR system simulator 20 to the device under test, thereby testing the DUT 100.

The reception sensitivity test control unit 18 includes a test condition setting unit 18b that sets a predetermined error tolerance level EL and an initial step level SL0, a throughput measurement unit 18c that measures a throughput related to reception capacity of a DUT 100 for each transmission and reception, a drop state determination unit 18*d* that determines whether or not the measured throughput is in a dropped state to a preset proportion in a steep drop region in which the throughput drops steeply, an output level variable setting unit 18*e* that performs a setting process of setting an output level of a test signal to be different from a previous output level according to a comparison result indicating whether or not a throughput measurement result exceeds a predetermined threshold value and a determination result indicating whether or not the measured throughput is in the dropped state determined by the drop state determination unit 18*d*, the setting process including a process of performing level down or level up on the output level of the test signal with respect to the previous output level in units of the error tolerance level EL when it is determined to be the dropped state, and a measurement result output unit 18*f* that continues the transmission and reception in a case where a fluctuation range with respect to the previous output level exceeds the error tolerance level EL which is set by the test condition setting unit 18*b*, and outputs a test result in a case where the fluctuation range with respect to the previous output level is in a range of the error tolerance level EL.

With the configuration, the measurement device 1 according to the present embodiment checks the fluctuation range of previous and current output levels while performing level down or level up on the output level of the test signal in units of the error tolerance level EL when the measured throughput drops to a proportion in a steep drop region a1. As a result, compared to a case of performing level down or level up on the output level using a step fluctuation range derived from the initial step level throughout an entire period without recognizing a state where the throughput drops to a preset proportion in the steep drop region a1, it is possible to reduce the number of transmissions and receptions, so that it is possible to significantly reduce the measurement time.

Further, in the measurement device 1 according to the present embodiment, the drop state determination unit 18*d* performs a process of determining whether or not the throughput is in the dropped state to the preset proportion in the steep drop region in which the throughput drops steeply in a case where the comparison result indicating that the throughput measurement result exceeds a predetermined threshold value, and an output level variable setting unit 18*e* performs each of a process of performing level down on the output level of the test signal by a value twice the error tolerance level EL from the previous output level according to the determination result indicating whether or not throughput is in the dropped state to the preset proportion in the steep drop region in which the throughput drops steeply and a process of performing level down on the output level of the test signal by a value corresponding to the initial step level SL0 from the previous output level in a case where the comparison result indicating that the throughput measurement result exceeds the threshold value is obtained, and performs a process of performing level up on the output level of the test signal by the value of the error tolerance level EL from the previous output level in a case where the comparison result indicating that the throughput measurement result does not exceed the threshold value is obtained.

With the configuration, the measurement device 1 according to the present embodiment continuously performs the transmission and reception at the output level obtained by performing level down on the output level of the test signal by the value twice the error tolerance level EL from the previous output level and the transmission and reception at the output level obtained by performing level up on the output level of the test signal by the value of the error tolerance level EL from the previous output level in the state where the measured throughput drops to the preset proportion in the steep drop region, so that a step fluctuation range therebetween is equal to or less than the set error tolerance level EL and the measurement is immediately ended. As a result, it possible to obtain the test result of the reception sensitivity test in an extremely short time.

Further, in the measurement device 1 according to the present embodiment, the test condition setting unit 18*b* sets a value of the throughput, which is measured by the throughput measurement unit 18*c* in first transmission and reception, as a reference value (100%), and sets a range of a proportion, which exceeds 95% and is equal to or less than 99%, as a determination condition for determining whether or not the measured throughput is in the dropped state. The drop state determination unit 18*d* determines whether or not the measured throughput is in the dropped state according to whether or not the measured throughput is in the range of the proportion.

According to the configuration, in a case where the measured throughput is a value which indicates that the measured throughput drops steeply in the range of the proportion which exceeds 95% and is equal to or less than 99%, the measurement device 1 according to the present embodiment can reduce the number of transmissions and receptions by stopping to perform level down or level up on the output level by the step fluctuation range derived from the initial step level, so that it is possible to significantly reduce the measurement time.

Further, the measurement device 1 according to the present embodiment has a configuration further including an OTA chamber 50 having an internal space 51, and a DUT scanning mechanism 56 that drives and scans the DUT 100 so as to continuously change an orientation of the DUT 100 in the internal space 51, in which the reception sensitivity test is performed in all orientations to be scanned by the DUT scanning mechanism 56 in an OTA measurement environment in the internal space 51.

With the configuration, the measurement device 1 according to the present embodiment can reduce the number of transmission and reception to significantly reduce the time for the reception sensitivity test by introducing the CP even under a situation in which reception sensitivity measurement should be performed for all orientations under the OTA environment.

Further, a mobile terminal testing method applied to the measurement device 1 according to the present embodiment is a mobile terminal testing method for testing (reception sensitivity test) a DUT 100 which is a device under test by repeating transmission and reception of a test signal from an NR system simulator 20 to the device under test and executing a test for calculating reception sensitivity, the mobile terminal testing method includes a test condition setting step (S1) of setting a predetermined error tolerance level EL and an initial step level SL0, a throughput measurement step (S4) of measuring a throughput related to reception capacity of the DUT 100 for each transmission and reception, a drop determination step (S7) of determining whether or not the measured throughput is in a state where the measured throughput drops to a preset proportion in a steep drop region in which the throughput drops steeply, an output level setting step (S8*b*, S9) of performing a setting process of setting an output level of the test signal to be different from a previous output level according to a comparison result indicating whether or not a throughput measurement result exceeds a predetermined threshold value and a determination result indicating whether or not the measured throughput is in a state where the throughput obtained in the drop determination step drops to a preset proportion in a steep drop region a1, the setting process including a process of performing level down or level up on the output level of the test signal with respect to the previous output level in units of the error tolerance level EL when it is determined to be the state where the throughput drops, and a measurement result output step (S10) of continuing the transmission and reception in a case where a fluctuation range from the previous output level exceeds the error tolerance level EL which is set in the test condition setting step, and outputting a test result in a case where the fluctuation range from the previous output level is in a range of the error tolerance level EL.

With the configuration, the mobile terminal testing method according to the present embodiment includes checking the fluctuation range of previous and current output levels while performing level down or level up on the output level of the test signal in units of the error tolerance level EL when the measured throughput drops to a proportion in a steep drop region a1. As a result, compared to a case of performing level down or level up on the output level using a step fluctuation range derived from the initial step level throughout an entire period without recognizing a state where the throughput drops to a preset proportion in the steep drop region a1, it is possible to reduce the number of transmissions and receptions, so that it is possible to significantly reduce the measurement time.

INDUSTRIAL APPLICABILITY

As described above, the mobile terminal testing device and the mobile terminal testing method according to the present invention have advantages in that it is possible to set an output level of a test signal to a testable level in a short time and it is possible to efficiently perform a reception sensitivity test of the mobile terminal, and are useful for all the mobile terminal testing device and the measuring method for performing a reception sensitivity test of a mobile terminal, such as a 5G wireless terminal, having high-speed communication capability.

DESCRIPTION OF REFERENCE NUMERALS AND SIGNS

1: Measurement device (Mobile terminal testing device)
5: Test antenna
10: Integrated control device
16: DUT scanning control unit (Scanning means)
18: Reception sensitivity test control unit (Reception sensitivity test execution means)
18b: Test condition setting unit (Test condition setting means)
18c: Throughput measurement unit (Throughput measurement means)
18d: Drop state determination unit (Drop determination means)
18e: Output level variable setting unit (Output level setting means)
18f: Measurement result output unit (Measurement result output means)
20: NR system simulator (Signal generator)
50: OTA chamber (radio anechoic box)
51: Internal space
56: DUT scanning mechanism (Scanning means)
100: DUT (Device Under Test, Mobile terminal)

What is claimed is:

1. A mobile terminal testing device for testing a mobile terminal, which is a device under test, comprising:
    reception sensitivity test execution means for executing a test of calculating reception sensitivity by repeating transmission and reception of a test signal from a signal generator to the device under test, wherein
    the reception sensitivity test execution means includes
        test condition setting means for setting a predetermined error tolerance level,
        throughput measurement means for measuring a throughput related to reception capacity of the mobile terminal for each transmission and reception,
        drop determination means for determining whether the measured throughput is in a dropped state to a preset proportion in a steep drop region in which the throughput drops steeply,
        output level setting means for performing a setting process of setting an output level of the test signal to be different from a previous output level according to a comparison result indicating whether a throughput measurement result exceeds a predetermined threshold value and a determination result indicating whether the measured throughput is in the dropped state by the drop determination means, the setting process including a process of performing level down or level up on the output level of the test signal with respect to the previous output level in units of the error tolerance level when it is determined to be the dropped state, and
        measurement result output means for continuing the transmission and reception in a case where a fluctuation range with respect to the previous output level exceeds the error tolerance level which is set by the test condition setting means, and outputting a test result in a case where the fluctuation range with respect to the previous output level is in a range of the error tolerance level.

2. The mobile terminal testing device according to claim 1, wherein
    the test condition setting means further sets an initial step fluctuation range related to a step fluctuation of the output level,
    the drop determination means executes a process of determining whether the measured throughput is in the dropped state when the comparison result indicating that the throughput measurement result exceeds the threshold value is obtained, and
    the output level setting means performs a process of performing level down on the output level of the test signal by a value twice the error tolerance level from the previous output level according to the determination result indicating whether the measured throughput is in the dropped state or a process of performing level down on the output level of the test signal by a value corresponding to the initial step fluctuation range from the previous output level in a case where the comparison result indicating that the throughput measurement result exceeds the threshold value is obtained, and performs a process of performing level up on the output level of the test signal by a value of the error tolerance level from the previous output level in a case where the comparison result indicating that the throughput measurement result does not exceed the threshold value is obtained.

3. The mobile terminal testing device according to claim 2, wherein the test condition setting means uses a value of the throughput, which is measured by the throughput measurement means in a first transmission and reception, as a reference value, and sets a range of a proportion which exceeds 95% and is equal to or less than 99% with respect to the reference value as a determination condition for determining whether the measured throughput is in the dropped state, and the drop determination means determines whether the measured throughput is in the dropped state according to whether the measured throughput is in the range of the proportion.

4. The mobile terminal testing device according to claim 3, further comprising:

a radio anechoic box including an internal space; and scanning means for driving and scanning the mobile terminal so as to continuously change an orientation of the mobile terminal in the internal space, wherein the reception sensitivity test is performed in all orientations to be scanned by the scanning means in an over an air (OTA) measurement environment in the internal space.

5. The mobile terminal testing device according to claim 2, further comprising:

a radio anechoic box including an internal space; and scanning means for driving and scanning the mobile terminal so as to continuously change an orientation of the mobile terminal in the internal space, wherein the reception sensitivity test is performed in all orientations to be scanned by the scanning means in an over an air (OTA) measurement environment in the internal space.

6. The mobile terminal testing device according to claim 1, wherein the test condition setting means uses a value of the throughput, which is measured by the throughput measurement means in a first transmission and reception, as a reference value, and sets a range of a proportion which exceeds 95% and is equal to or less than 99% with respect to the reference value as a determination condition for determining whether the measured throughput is in the dropped state, and the drop determination means determines whether the measured throughput is in the dropped state according to whether the measured throughput is in the range of the proportion.

7. The mobile terminal testing device according to claim 6, further comprising:

a radio anechoic box including an internal space; and scanning means for driving and scanning the mobile terminal so as to continuously change an orientation of the mobile terminal in the internal space, wherein the reception sensitivity test is performed in all orientations to be scanned by the scanning means in an over an air (OTA) measurement environment in the internal space.

8. The mobile terminal testing device according to claim 1, further comprising:

a radio anechoic box including an internal space; and scanning means for driving and scanning the mobile terminal so as to continuously change an orientation of the mobile terminal in the internal space, wherein the reception sensitivity test is performed in all orientations to be scanned by the scanning means in an over an air (OTA) measurement environment in the internal space.

9. A mobile terminal testing method for testing a mobile terminal which is a device under test by executing a test of calculating reception sensitivity by repeating transmission and reception of a test signal from a signal generator to the device under test, the mobile terminal testing method comprising:

a test condition setting step of setting a predetermined error tolerance level;

a throughput measurement step of measuring a throughput related to reception capacity of the mobile terminal for each transmission and reception;

a drop determination step of determining whether the measured throughput is in a dropped state to a preset proportion in a steep drop region in which the throughput drops steeply;

an output level setting step of performing a setting process of setting an output level of the test signal to be different from a previous output level according to a comparison result indicating whether a throughput measurement result exceeds a predetermined threshold value and a determination result indicating whether or not the measured throughput is in the dropped state by the drop determination step, the setting process including a process of performing level down or level up on the output level of the test signal with respect to the previous output level in units of the error tolerance level when it is determined to be the dropped state; and a measurement result output step of continuing the transmission and reception in a case where a fluctuation range with respect to the previous output level exceeds the error tolerance level which is set by the test condition setting step, and outputting a test result in a case where the fluctuation range with respect to the previous output level is in a range of the error tolerance level.

* * * * *